US009065902B2

(12) United States Patent
Pappalardo et al.

(10) Patent No.: US 9,065,902 B2
(45) Date of Patent: *Jun. 23, 2015

(54) METHOD AND SYSTEM FOR MANAGING CHANGES TO A CONTACT DATABASE

(75) Inventors: Susan Elizabeth Pappalardo, Kirkland, WA (US); Jason William Fuller, Bellevue, WA (US); Peter G. Chin, Seattle, WA (US); Jessica Dale Tenenbaum, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 678 days.

This patent is subject to a terminal disclaimer.

(21) Appl. No.: 11/115,590

(22) Filed: Apr. 26, 2005

(65) Prior Publication Data
US 2005/0208971 A1 Sep. 22, 2005

Related U.S. Application Data

(63) Continuation of application No. 10/061,763, filed on Feb. 1, 2002, now Pat. No. 6,909,910.

(51) Int. Cl.
H04M 3/42 (2006.01)
H04M 1/2745 (2006.01)
(Continued)

(52) U.S. Cl.
CPC .... *H04M 1/27455* (2013.01); *H04M 1/274508* (2013.01); *H04M 1/274525* (2013.01);
(Continued)

(58) Field of Classification Search
CPC . G06F 3/0482; G06F 3/04842; G06F 3/0488; G06F 3/0481; G06F 3/0489

USPC .............. 455/415, 425, 556.2, 566, 551, 560; 715/271, 273, 819, 820
See application file for complete search history.

(56) References Cited

U.S. PATENT DOCUMENTS 4,058,672 A 11/1977 Crager et al. ................. 370/394
4,780,821 A 10/1988 Crossley ...................... 718/100
(Continued)

FOREIGN PATENT DOCUMENTS

CA 2120461 3/1994
EP 0462587 12/1996
(Continued)

OTHER PUBLICATIONS

Amendment dated Mar. 31, 2009, in U.S. Appl. No. 11/115,589.
(Continued)

*Primary Examiner* — Tu X Nguyen
(74) *Attorney, Agent, or Firm* — Micah Goldsmith; Judy Yee; Micky Minhas

(57) ABSTRACT

Described is a system and method for updating a contact and adding a new contact from a call log in a communications device. The system includes a contact manager that is directed towards creating and updating call contact cards in a contact database with information retrieved from call logs of phone calls made to or from the communications device. In one embodiment, information is pre-populated into a predetermined data field of the contact card, thereby reducing workload to a user. The method includes determining if a request is for updating an existing contact card or for adding a new contact card to the contact database. The update or addition is made with information retrieved from call logs. Call information is pre-populated into a predetermined data field of the contact card, when it is determined that the request is to add a new contact card to the contact database.

20 Claims, 8 Drawing Sheets

(51) Int. Cl.
*H04M 1/56* (2006.01)
*H04M 1/57* (2006.01)

(52) U.S. Cl.
CPC .......... *H04M1/274533* (2013.01); *H04M 1/56* (2013.01); *H04M 1/575* (2013.01); *H04M 2250/60* (2013.01); *Y10S 707/99943* (2013.01); *Y10S 707/99942* (2013.01)

(56) References Cited

U.S. PATENT DOCUMENTS

| | | | |
|---|---|---|---|
| 4,789,962 A | 12/1988 | Berry | 715/715 |
| 4,945,475 A | 7/1990 | Bruffey et al. | 1/1 |
| 4,945,476 A | 7/1990 | Bodick et al. | 600/301 |
| 4,987,531 A | 1/1991 | Nishikado et al. | 1/1 |
| 4,999,766 A | 3/1991 | Peters et al. | 1/1 |
| 5,058,000 A | 10/1991 | Cox et al. | 1/1 |
| 5,083,264 A | 1/1992 | Platteter et al. | 714/5.11 |
| 5,129,088 A | 7/1992 | Auslander et al. | 711/1 |
| 5,157,768 A | 10/1992 | Hoeber | 715/711 |
| 5,179,703 A | 1/1993 | Evans | 717/122 |
| 5,202,982 A | 4/1993 | Gramlich et al. | 1/1 |
| 5,202,983 A | 4/1993 | Orita et al. | 707/694 |
| 5,204,947 A | 4/1993 | Bernstein | 715/854 |
| 5,241,545 A | 8/1993 | Kazecki | 370/337 |
| 5,243,697 A | 9/1993 | Hoeber | 715/840 |
| 5,249,300 A | 9/1993 | Bachman | 1/1 |
| 5,287,502 A | 2/1994 | Kaneko | 1/1 |
| 5,291,595 A | 3/1994 | Martins | 1/1 |
| 5,297,249 A | 3/1994 | Bernstein | 715/854 |
| 5,307,494 A | 4/1994 | Yasumatsu et al. | 1/1 |
| 5,313,646 A | 5/1994 | Hendricks et al. | 1/1 |
| 5,317,733 A | 5/1994 | Murdock | 1/1 |
| 5,329,427 A | 7/1994 | Hogdahl | 361/730 |
| 5,333,266 A | 7/1994 | Boaz | 709/206 |
| 5,347,628 A | 9/1994 | Brewer | 715/775 |
| 5,355,497 A | 10/1994 | Cohen-Levy | 1/1 |
| 5,359,724 A | 10/1994 | Earle | 1/1 |
| 5,359,725 A | 10/1994 | Garcia et al. | 1/1 |
| 5,363,487 A | 11/1994 | Willman et al. | 710/8 |
| 5,367,671 A | 11/1994 | Feigenbaum et al. | 1/1 |
| 5,371,885 A | 12/1994 | Letwin | 1/1 |
| 5,388,257 A | 2/1995 | Bauer | 707/741 |
| 5,392,390 A | 2/1995 | Crozier | 715/751 |
| 5,392,427 A | 2/1995 | Barrett | 707/800 |
| 5,412,808 A | 5/1995 | Bauer | 707/822 |
| 5,421,001 A | 5/1995 | Methe | 1/1 |
| 5,434,974 A | 7/1995 | Loucks et al. | 1/1 |
| 5,437,029 A | 7/1995 | Sinha | 1/1 |
| 5,483,652 A | 1/1996 | Sudama et al. | 709/201 |
| 5,485,606 A | 1/1996 | Midgdey et al. | 1/1 |
| 5,530,828 A | 6/1996 | Kaki | 711/103 |
| 5,535,375 A | 7/1996 | Eshel | 703/27 |
| 5,537,592 A | 7/1996 | King | 707/756 |
| 5,579,517 A | 11/1996 | Reynolds | 1/1 |
| 5,581,686 A | 12/1996 | Koppolu | 715/784 |
| 5,596,755 A | 1/1997 | Pletcher | 710/261 |
| 5,598,370 A | 1/1997 | Niijima | 365/185.33 |
| 5,600,834 A | 2/1997 | Howard | 713/178 |
| 5,627,996 A | 5/1997 | Bauer | 703/20 |
| 5,630,081 A | 5/1997 | Rybicki | 715/839 |
| 5,647,002 A | 7/1997 | Brunson | 709/206 |
| 5,664,228 A | 9/1997 | Mital | 710/62 |
| 5,666,530 A | 9/1997 | Clark | 1/1 |
| 5,684,990 A | 11/1997 | Boothby | 1/1 |
| 5,694,606 A | 12/1997 | Pletcher | 710/261 |
| 5,701,423 A | 12/1997 | Crozier | 715/762 |
| 5,721,922 A | 2/1998 | Dingwall | 718/103 |
| 5,729,687 A | 3/1998 | Rothrock | 709/204 |
| 5,734,816 A | 3/1998 | Niijima | 714/6.13 |
| 5,737,601 A | 4/1998 | Jain | 707/622 |
| 5,745,418 A | 4/1998 | Ma | 365/185.33 |
| 5,745,752 A | 4/1998 | Hurvig | 1/1 |
| 5,745,902 A | 4/1998 | Miller | 1/1 |
| 5,752,195 A * | 5/1998 | Tsuji et al. | 455/462 |
| 5,754,848 A | 5/1998 | Hanes | 1/1 |
| 5,757,616 A | 5/1998 | May | 361/679.57 |
| 5,758,352 A | 5/1998 | Reynolds | 1/1 |
| 5,758,354 A | 5/1998 | Huang | 1/1 |
| 5,761,675 A | 6/1998 | Isenberg | 1/1 |
| 5,765,169 A | 6/1998 | Conner | 1/1 |
| 5,767,854 A | 6/1998 | Anwar | 715/848 |
| 5,787,262 A | 7/1998 | Shakib | 709/205 |
| 5,799,168 A | 8/1998 | Ban | 711/103 |
| 5,799,305 A | 8/1998 | Bortvedt | 1/1 |
| 5,805,830 A | 9/1998 | Reese | 709/205 |
| 5,812,749 A | 9/1998 | Fernandez | 714/4.4 |
| 5,812,773 A | 9/1998 | Norin | 709/204 |
| 5,812,793 A | 9/1998 | Shakib | 709/201 |
| 5,819,275 A | 10/1998 | Badger | 707/758 |
| 5,826,265 A | 10/1998 | Van Huben | 1/1 |
| 5,832,218 A | 11/1998 | Gibbs | 709/203 |
| 5,832,489 A | 11/1998 | Kucala | 1/1 |
| 5,856,978 A | 1/1999 | Anthias | 370/429 |
| 5,867,641 A | 2/1999 | Jenett | 714/6.32 |
| 5,878,408 A | 3/1999 | Van Huben | 1/1 |
| 5,884,323 A | 3/1999 | Hawkins | 1/1 |
| 5,884,325 A | 3/1999 | Bauer | 1/1 |
| 5,884,328 A | 3/1999 | Mosher | 1/1 |
| 5,887,198 A | 3/1999 | Houlberg | 710/62 |
| 5,903,752 A | 5/1999 | Dingwall | 718/103 |
| 5,920,873 A | 7/1999 | Van Huben | 1/1 |
| 5,924,094 A | 7/1999 | Sutter | 1/1 |
| 5,924,096 A | 7/1999 | Draper | 1/1 |
| 5,926,501 A | 7/1999 | Souissi | 375/131 |
| 5,926,805 A | 7/1999 | Hurvig | 707/690 |
| 5,928,329 A | 7/1999 | Clark | 709/227 |
| 5,930,268 A | 7/1999 | Kurby | 379/355.06 |
| 5,930,350 A | 7/1999 | Johnson | 379/355.06 |
| 5,937,425 A | 8/1999 | Ban | 711/103 |
| 5,943,055 A | 8/1999 | Sylvan | 715/839 |
| 5,956,473 A | 9/1999 | Ma et al. | 714/5.1 |
| 5,960,406 A | 9/1999 | Rasansky | 705/7.18 |
| 5,961,590 A | 10/1999 | Mendez | 709/206 |
| 5,974,426 A | 10/1999 | Lee | 1/1 |
| 5,991,771 A | 11/1999 | Falls | 1/1 |
| 5,991,778 A | 11/1999 | Starek | 1/1 |
| 6,014,724 A | 1/2000 | Jenett | 711/103 |
| 6,016,478 A | 1/2000 | Zhang | 705/7.19 |
| 6,018,571 A | 1/2000 | Langlois | 379/201.04 |
| 6,018,761 A | 1/2000 | Uomini | 709/206 |
| 6,034,621 A | 3/2000 | Kaufman | 340/7.21 |
| 6,055,527 A | 4/2000 | Badger | 1/1 |
| 6,058,401 A | 5/2000 | Stamos | 1/1 |
| 6,070,174 A | 5/2000 | Starek | 1/1 |
| 6,078,999 A | 6/2000 | Raju | 711/161 |
| 6,098,093 A | 8/2000 | Bayeh | 709/203 |
| 6,141,564 A | 10/2000 | Bruner | 455/558 |
| 6,208,996 B1 | 3/2001 | Ben-Shachar | 1/1 |
| 6,269,254 B1 | 7/2001 | Mathis | 455/557 |
| 6,279,069 B1 | 8/2001 | Robinson | 711/103 |
| 6,347,051 B2 | 2/2002 | Yamagami | 365/185.09 |
| 6,405,218 B1 | 6/2002 | Boothby | 1/1 |
| 6,584,185 B1 | 6/2003 | Nixom | 379/201.01 |
| 6,741,994 B1 | 5/2004 | Kang | 1/1 |
| 6,909,910 B2 | 6/2005 | Pappalardo et al. | 455/558 |
| 6,928,300 B1 | 8/2005 | Skinner | 455/556.2 |
| 7,289,614 B1* | 10/2007 | Twerdahl et al. | 379/142.01 |
| 7,664,485 B2 | 2/2010 | Twerdahl et al. | |
| 8,488,761 B2 | 7/2013 | Reding et al. | |
| 8,503,637 B1 | 8/2013 | Kirchhoff et al. | |
| 2001/0034244 A1* | 10/2001 | Calder et al. | 455/556 |
| 2002/0046299 A1 | 4/2002 | Lefeber | 719/318 |
| 2002/0052968 A1 | 5/2002 | Bonefas | 709/231 |
| 2002/0114438 A1 | 8/2002 | Ganugapati | |
| 2002/0184407 A1 | 12/2002 | Shell | 719/328 |
| 2003/0028602 A1 | 2/2003 | Bhattacharya | 709/206 |
| 2003/0063732 A1* | 4/2003 | Mcknight | 379/210.01 |
| 2003/0078981 A1* | 4/2003 | Harms et al. | 709/206 |
| 2003/0083046 A1 | 5/2003 | Mathis | 455/412.1 |
| 2003/0091173 A1* | 5/2003 | DeSalvo | 379/142.01 |
| 2003/0148790 A1 | 8/2003 | Pappalardo | 455/558 |
| 2004/0066920 A1 | 4/2004 | Vandermeijden | 379/88.19 |
| 2004/0229644 A1* | 11/2004 | Heie et al. | 455/551 |

(56) References Cited

U.S. PATENT DOCUMENTS

| | | | |
|---|---|---|---|
| 2005/0091219 A1 | 4/2005 | Karachale | 1/1 |
| 2005/0117733 A1 | 6/2005 | Widger et al. | |
| 2005/0208970 A1 | 9/2005 | Pappalardo et al. | 455/558 |
| 2005/0208971 A1 | 9/2005 | Pappalardo et al. | |

FOREIGN PATENT DOCUMENTS

| | | | |
|---|---|---|---|
| EP | 0578205 | 3/2000 | |
| EP | 0994614 | 4/2000 | H04L 29/06 |
| EP | 0618540 | 12/2001 | |
| JP | 6441039 | 2/1989 | |
| JP | 1315843 | 12/1989 | |
| JP | 2148341 | 6/1990 | |
| JP | 4297934 | 10/1992 | |
| JP | 6019763 | 1/1994 | |
| WO | WO96/06393 | 2/1996 | G06F 9/44 |

OTHER PUBLICATIONS

Amendment dated Aug. 11, 2009, in U.S. Appl. No. 11/115,589.
Amendment dated Dec. 14, 2009, in U.S. Appl. No. 11/115,589.
Amendment dated Aug. 20, 2010, in U.S. Appl. No. 11/115,589.
Amendment dated Dec. 10, 2010, in U.S. Appl. No. 11/115,589.
Office Action mailed Dec. 31, 2008, in U.S. Appl. No. 11/115,589.
Office Action mailed May 11, 2009, in U.S. Appl. No. 11/115,589.
Office Action mailed Sep. 14, 2009, in U.S. Appl. No. 11/115,589.
Office Action mailed Feb. 22, 2010, in U.S. Appl. No. 11/115,589.
Office Action mailed Sep. 10, 2010, in U.S. Appl. No. 11/115,589.
Amendment dated May 23, 2011, in U.S. Appl. No. 11/115,589.
Office Action mailed Jan. 5, 2011, in U.S. Appl. No. 11/115,589.
ITC Investigation No. 337-744, captioned: "Certain Mobile Devices, Associated Software, and Components Thereof" "Exhibit 49".
ITC Investigation No. 337-744, captioned: "Certain Mobile Devices, Associated Software, and Components Thereof" "Exhibit 50".
ITC Investigation No. 337-744, captioned: "Certain Mobile Devices, Associated Software, and Components Thereof" "Exhibit 51".
ITC Investigation No. 337-744, captioned: "Certain Mobile Devices, Associated Software, and Components Thereof" "Exhibit 52".
ITC Investigation No. 337-744, captioned: "Certain Mobile Devices, Associated Software, and Components Thereof" "Exhibit 53".
ITC Investigation No. 337-744, captioned: "Certain Mobile Devices, Associated Software, and Components Thereof" "Exhibit 54".
ITC Investigation No. 337-744, captioned: "Certain Mobile Devices, Associated Software, and Components Thereof" "Exhibit 55".
ITC Investigation No. 337-744, captioned: "Certain Mobile Devices, Associated Software, and Components Thereof" "Exhibit 56".
ITC Investigation No. 337-744, captioned: "Certain Mobile Devices, Associated Software, and Components Thereof" "Exhibit 57".
ITC Investigation No. 337-744, captioned: "Certain Mobile Devices, Associated Software, and Components Thereof" "Exhibit 58".
ITC Investigation No. 337-744, captioned: "Certain Mobile Devices, Associated Software, and Components Thereof" "Exhibit 59".
ITC Investigation No. 337-744, captioned: "Certain Mobile Devices, Associated Software, and Components Thereof" "Exhibit 1".
ITC Investigation No. 337-744, captioned: "Certain Mobile Devices, Associated Software, and Components Thereof""First Amended Verified Complaint".
ITC Investigation No. 337-744, captioned: "Certain Mobile Devices, Associated Software, and Components Thereof" "Respondents Motorola Response to the Amended Complaint".
ITC Investigation No. 337-744, captioned: "Certain Mobile Devices, Associated Software, and Components Thereof" "Original Verification to Motorola's Response to Amended Complaint".
ITC Investigation No. 337-744, captioned: "Certain Mobile Devices, Associated Software, and Components Thereof" "Discovery Statement of the Commission Investigative Staff".
ITC Investigation No. 337-744, captioned: "Certain Mobile Devices, Associated Software, and Components Thereof" "Microsoft's Opening Claim Construction Brief".
ITC Investigation No. 337-744, captioned: "Certain Mobile Devices, Associated Software, and Components Thereof" "Exhibit List".
ITC Investigation No. 337-744, captioned: "Certain Mobile Devices, Associated Software, and Components Thereof" "Exhibit 101".
ITC Investigation No. 337-744, captioned: "Certain Mobile Devices, Associated Software, and Components Thereof" "Exhibit 102".
ITC Investigation No. 337-744, captioned: "Certain Mobile Devices, Associated Software, and Components Thereof" "Exhibit 103".
ITC Investigation No. 337-744, captioned: "Certain Mobile Devices, Associated Software, and Components Thereof" "Exhibit 104".
ITC Investigation No. 337-744, captioned: "Certain Mobile Devices, Associated Software, and Components Thereof" "Exhibit 201".
ITC Investigation No. 337-744, captioned: "Certain Mobile Devices, Associated Software, and Components Thereof" "Exhibit 301".
ITC Investigation No. 337-744, captioned: "Certain Mobile Devices, Associated Software, and Components Thereof" "Exhibit 302".
ITC Investigation No. 337-744, captioned: "Certain Mobile Devices, Associated Software, and Components Thereof" "Exhibit 303".
ITC Investigation No. 337-744, captioned: "Certain Mobile Devices, Associated Software, and Components Thereof" "Exhibit 401".
ITC Investigation No. 337-744, captioned: "Certain Mobile Devices, Associated Software, and Components Thereof" "Exhibit 402 pt1".
ITC Investigation No. 337-744, captioned: "Certain Mobile Devices, Associated Software, and Components Thereof" "Exhibit 402 pt2".
ITC Investigation No. 337-744, captioned: "Certain Mobile Devices, Associated Software, and Components Thereof" "Exhibit 501".
ITC Investigation No. 337-744, captioned: "Certain Mobile Devices, Associated Software, and Components Thereof" "Exhibit 502".
ITC Investigation No. 337-744, captioned: "Certain Mobile Devices, Associated Software, and Components Thereof" "Exhibit 503".
ITC Investigation No. 337-744, captioned: "Certain Mobile Devices, Associated Software, and Components Thereof" "Exhibit 504".
ITC Investigation No. 337-744, captioned: "Certain Mobile Devices, Associated Software, and Components Thereof" "Exhibit 505".
ITC Investigation No. 337-744, captioned: "Certain Mobile Devices, Associated Software, and Components Thereof" "Exhibit 601".
ITC Investigation No. 337-744, captioned: "Certain Mobile Devices, Associated Software, and Components Thereof" "Exhibit 602".
ITC Investigation No. 337-744, captioned: "Certain Mobile Devices, Associated Software, and Components Thereof" "Exhibit 701".
ITC Investigation No. 337-744, captioned: "Certain Mobile Devices, Associated Software, and Components Thereof" "Exhibit 702 pt1".
ITC Investigation No. 337-744, captioned: "Certain Mobile Devices, Associated Software, and Components Thereof" "Exhibit 702 pt2".
ITC Investigation No. 337-744, captioned: "Certain Mobile Devices, Associated Software, and Components Thereof" "Exhibit 703".
ITC Investigation No. 337-744, captioned: "Certain Mobile Devices, Associated Software, and Components Thereof" "Exhibit 801".
ITC Investigation No. 337-744, captioned: "Certain Mobile Devices, Associated Software, and Components Thereof" "Exhibit 802 pt2".
ITC Investigation No. 337-744, captioned: "Certain Mobile Devices, Associated Software, and Components Thereof" "Exhibit 802".
ITC Investigation No. 337-744, captioned: "Certain Mobile Devices, Associated Software, and Components Thereof" "Exhibit 803".
ITC Investigation No. 337-744, captioned: "Certain Mobile Devices, Associated Software, and Components Thereof" "Public Exhibit 804".
ITC Investigation No. 337-744, captioned: "Certain Mobile Devices, Associated Software, and Components Thereof" "Exhibit 901".
ITC Investigation No. 337-744, captioned: "Certain Mobile Devices, Associated Software, and Components Thereof" "Exhibit 902—Part 1".
ITC Investigation No. 337-744, captioned: "Certain Mobile Devices, Associated Software, and Components Thereof" "Exhibit 902 Prt2".
ITC Investigation No. 337-744, captioned: "Certain Mobile Devices, Associated Software, and Components Thereof" "Exhibit 902 pt3".
ITC Investigation No. 337-744, captioned: "Certain Mobile Devices, Associated Software, and Components Thereof" "Exhibit 903".
ITC Investigation No. 337-744, captioned: "Certain Mobile Devices, Associated Software, and Components Thereof".
ITC Investigation No. 337-744, captioned: "Certain Mobile Devices, Associated Software, and Components Thereof" "Appendix C Index".

(56) References Cited

OTHER PUBLICATIONS

ITC Investigation No. 337-744, captioned: "Certain Mobile Devices, Associated Software, and Components Thereof" "Appendix C1".

ITC Investigation No. 337-744, captioned: "Certain Mobile Devices, Associated Software, and Components Thereof" "Appendix C2_Tech Refs Cited in 6621746".

ITC Investigation No. 337-744, captioned: "Certain Mobile Devices, Associated Software, and Components Thereof" "Appendix D Index-CD 1 of 1".

ITC Investigation No. 337-744, captioned: "Certain Mobile Devices, Associated Software, and Components Thereof" "Appendix D".

ITC Investigation No. 337-744, captioned: "Certain Mobile Devices, Associated Software, and Components Thereof" "Appendix D1_part 1".

ITC Investigation No. 337-744, captioned: "Certain Mobile Devices, Associated Software, and Components Thereof" "Appendix D1 _ part 2".

ITC Investigation No. 337-744, captioned: "Certain Mobile Devices, Associated Software, and Components Thereof" "Appendix D2_000 Tech Refs Cited in 6826762".

ITC Investigation No. 337-744, captioned: "Certain Mobile Devices, Associated Software, and Components Thereof" "Appendix E Index-CD 1 of 1".

ITC Investigation No. 337-744, captioned: "Certain Mobile Devices, Associated Software, and Components Thereof" "Appendix E".

ITC Investigation No. 337-744, captioned: "Certain Mobile Devices, Associated Software, and Components Thereof" "Appendix E1 6909910_Certified FH".

ITC Investigation No. 337-744, captioned: "Certain Mobile Devices, Associated Software, and Components Thereof" "Appendix E2_000 Tech Refs Cited in 6909910".

ITC Investigation No. 337-744, captioned: "Certain Mobile Devices, Associated Software, and Components Thereof" "Appendix F Index-CD 1 of 1".

ITC Investigation No. 337-744, captioned: "Certain Mobile Devices, Associated Software, and Components Thereof" "Appendix F".

ITC Investigation No. 337-744, captioned: "Certain Mobile Devices, Associated Software, and Components Thereof" "Appendix F1 7644376_Certified FH".

ITC Investigation No. 337-744, captioned: "Certain Mobile Devices, Associated Software, and Components Thereof" "Appendix F2_000.Tech Refs Cited in 7644376".

ITC Investigation No. 337-744, captioned: "Certain Mobile Devices, Associated Software, and Components Thereof" "Appendix F2_009 U.S. Appl. No. 60/513,723".

ITC Investigation No. 337-744, captioned: "Certain Mobile Devices, Associated Software, and Components Thereof" "Appendix G Index-CD 1 of 1".

ITC Investigation No. 337-744, captioned: "Certain Mobile Devices, Associated Software, and Components Thereof" "Appendix G2_000 Tech Refs Cited in 5664133".

ITC Investigation No. 337-744, captioned: "Certain Mobile Devices, Associated Software, and Components Thereof" "Appendix I Index-CD 1 of 1".

ITC Investigation No. 337-744, captioned: "Certain Mobile Devices, Associated Software, and Components Thereof" "Appendix I2_000. Tech Refs Cited in 6370566".

ITC Investigation No. 337-744, captioned: "Certain Mobile Devices, Associated Software, and Components Thereof" "Appendix I2_034. Byrne_The MS Outlook 97 Automation Model".

ITC Investigation No. 337-744, captioned: "Certain Mobile Devices, Associated Software, and Components Thereof" "Appendix I2_035. IBM Tech Discl Method for PDA Calendar".

ITC Investigation No. 337-744, captioned: "Certain Mobile Devices, Associated Software, and Components Thereof" "Appendix I2_036. MS Apptitem Object".

ITC Investigation No. 337-744, captioned: "Certain Mobile Devices, Associated Software, and Components Thereof" "Appendix I2_037. MS RecurrencePattern Object".

ITC Investigation No. 337-744, captioned: "Certain Mobile Devices, Associated Software, and Components Thereof" "Appendix I2_038. MS RecurringEvent Object".

ITC Investigation No. 337-744, captioned: "Certain Mobile Devices, Associated Software, and Components Thereof" "Appendix I2_039. MSOffice 97 Guide_Chp 5 MS Outlook Objects".

ITC Investigation No. 337-744, captioned: "Certain Mobile Devices, Associated Software, and Components Thereof" "Appendix I2_040. OConnor_Managing Contacts in Windows 95".

ITC Investigation No. 337-744, captioned: "Certain Mobile Devices, Associated Software, and Components Thereof" "Appendix I2_041. Pepper_The CallManager System".

ITC Investigation No. 337-744, captioned: "Certain Mobile Devices, Associated Software, and Components Thereof" "Appendix H Index-CD 1 of 1".

ITC Investigation No. 337-744, captioned: "Certain Mobile Devices, Associated Software, and Components Thereof" "Appendix H1_Part 2".

ITC Investigation No. 337-744, captioned: "Certain Mobile Devices, Associated Software, and Components Thereof" "Appendix H2_000.Tech Refs Cited in 6578054".

ITC Investigation No. 337-744, captioned: "Certain Mobile Devices, Associated Software, and Components Thereof" "Appendix H2_013.Borenstein MIME Part One_1993".

ITC Investigation No. 337-744, captioned: "Certain Mobile Devices, Associated Software, and Components Thereof" "Appendix H2_014.Fielding Hypertext Trnsfer Protocol".

ITC Investigation No. 337-744, captioned: "Certain Mobile Devices, Associated Software, and Components Thereof" "Appendix H2_015.Fielding Hypertext Transfr Protocol".

ITC Investigation No. 337-744, captioned: "Certain Mobile Devices, Associated Software, and Components Thereof" "Appendix H2_016.Goland HTTP Exts for Distrib Authoring".

ITC Investigation No. 337-744, captioned: "Certain Mobile Devices, Associated Software, and Components Thereof" "Appendix H2_017.Martin Strategy for Distrib DP".

ITC Investigation No. 337-744, captioned: "Certain Mobile Devices, Associated Software, and Components Thereof" "Appendix H2_018.Slein Reqmnts for a Dist Authoring".

ITC Investigation No. 337-744, captioned: "Certain Mobile Devices, Associated Software, and Components Thereof" "Appendix H2_019.Yavin Republication Fact Track".

ITC Investigation No. 337-744, captioned: "Certain Mobile Devices, Associated Software, and Components Thereof" "Microsoft's Reply Claim Construction Brief".

ITC Investigation No. 337-744, captioned: "Certain Mobile Devices, Associated Software, and Components Thereof" "Exhibit 105".

ITC Investigation No. 337-744, captioned: "Certain Mobile Devices, Associated Software, and Components Thereof" "Exhibit 106".

ITC Investigation No. 337-744, captioned: "Certain Mobile Devices, Associated Software, and Components Thereof" "Exhibit 304".

ITC Investigation No. 337-744, captioned: "Certain Mobile Devices, Associated Software, and Components Thereof" "Exhibit 305".

ITC Investigation No. 337-744, captioned: "Certain Mobile Devices, Associated Software, and Components Thereof" "Exhibit 306".

ITC Investigation No. 337-744, captioned: "Certain Mobile Devices, Associated Software, and Components Thereof" "Exhibit 704".

ITC Investigation No. 337-744, captioned: "Certain Mobile Devices, Associated Software, and Components Thereof" "Exhibit 705".

ITC Investigation No. 337-744, captioned: "Certain Mobile Devices, Associated Software, and Components Thereof" "Respondents Motorola, Inc. and Motorola Mobility Inc. and Complainant Microsoft Corporation's Joint Claim Chart".

ITC Investigation No. 337-744, captioned: "Certain Mobile Devices, Associated Software, and Components Thereof" "A1 Photocopy of CD of 5579517".

ITC Investigation No. 337-744, captioned: "Certain Mobile Devices, Associated Software, and Components Thereof" "A2 Photocopy of CD 90-007007_Reexam 517".

ITC Investigation No. 337-744, captioned: "Certain Mobile Devices, Associated Software, and Components Thereof" "A3 Photocopy of CD 90-007371_Reexam 517".

(56) References Cited

OTHER PUBLICATIONS

ITC Investigation No. 337-744, captioned: "Certain Mobile Devices, Associated Software, and Components Thereof" "Appendix a Index—CD 1 of 5".
ITC Investigation No. 337-744, captioned: "Certain Mobile Devices, Associated Software, and Components Thereof" "Appendix A1_Part 1".
ITC Investigation No. 337-744, captioned: "Certain Mobile Devices, Associated Software, and Components Thereof" "Appendix A1_Part 2".
ITC Investigation No. 337-744, captioned: "Certain Mobile Devices, Associated Software, and Components Thereof" "Appendix A1_Part 3".
ITC Investigation No. 337-744, captioned: "Certain Mobile Devices, Associated Software, and Components Thereof" "Appendix A1_Part 4".
ITC Investigation No. 337-744, captioned: "Certain Mobile Devices, Associated Software, and Components Thereof" "Appendix A2_Part 1".
ITC Investigation No. 337-744, captioned: "Certain Mobile Devices, Associated Software, and Components Thereof" "Appendix A2_Part 10".
ITC Investigation No. 337-744, captioned: "Certain Mobile Devices, Associated Software, and Components Thereof" "Appendix A2_Part 11".
ITC Investigation No. 337-744, captioned: "Certain Mobile Devices, Associated Software, and Components Thereof" "Appendix A2_Part 12".
ITC Investigation No. 337-744, captioned: "Certain Mobile Devices, Associated Software, and Components Thereof" "Appendix A2_Part 13".
ITC Investigation No. 337-744, captioned: "Certain Mobile Devices, Associated Software, and Components Thereof" "Appendix A2_Part 14".
ITC Investigation No. 337-744, captioned: "Certain Mobile Devices, Associated Software, and Components Thereof" "Appendix A2_Part 15".
ITC Investigation No. 337-744, captioned: "Certain Mobile Devices, Associated Software, and Components Thereof" "Appendix A2_Part 16".
ITC Investigation No. 337-744, captioned: "Certain Mobile Devices, Associated Software, and Components Thereof" "Appendix A2_Part 17".
ITC Investigation No. 337-744, captioned: "Certain Mobile Devices, Associated Software, and Components Thereof" "Appendix A2_Part 18".
ITC Investigation No. 337-744, captioned: "Certain Mobile Devices, Associated Software, and Components Thereof" "Appendix A2_Part 2".
ITC Investigation No. 337-744, captioned: "Certain Mobile Devices, Associated Software, and Components Thereof" "Appendix A2_Part 3".
ITC Investigation No. 337-744, captioned: "Certain Mobile Devices, Associated Software, and Components Thereof" "Appendix A2_Part 4".
ITC Investigation No. 337-744, captioned: "Certain Mobile Devices, Associated Software, and Components Thereof" "Appendix A2_Part 5".
ITC Investigation No. 337-744, captioned: "Certain Mobile Devices, Associated Software, and Components Thereof" "Appendix A2_Part 6".
ITC Investigation No. 337-744, captioned: "Certain Mobile Devices, Associated Software, and Components Thereof" "Appendix A2_Part 7".
ITC Investigation No. 337-744, captioned: "Certain Mobile Devices, Associated Software, and Components Thereof" "Appendix A2_Part 8".
ITC Investigation No. 337-744, captioned: "Certain Mobile Devices, Associated Software, and Components Thereof" "Appendix A2_Part 9".
ITC Investigation No. 337-744, captioned: "Certain Mobile Devices, Associated Software, and Components Thereof" "Appendix A3_Part 1".
ITC Investigation No. 337-744, captioned: "Certain Mobile Devices, Associated Software, and Components Thereof" "Appendix A3_Part 10".
ITC Investigation No. 337-744, captioned: "Certain Mobile Devices, Associated Software, and Components Thereof" "Appendix A3_Part 11".
ITC Investigation No. 337-744, captioned: "Certain Mobile Devices, Associated Software, and Components Thereof" "Appendix A3_Part 12".
ITC Investigation No. 337-744, captioned: "Certain Mobile Devices, Associated Software, and Components Thereof" "Appendix A3_Part 13".
ITC Investigation No. 337-744, captioned: "Certain Mobile Devices, Associated Software, and Components Thereof" "Appendix A3_Part 14".
ITC Investigation No. 337-744, captioned: "Certain Mobile Devices, Associated Software, and Components Thereof" "Appendix A3_Part 15".
ITC Investigation No. 337-744, captioned: "Certain Mobile Devices, Associated Software, and Components Thereof" "Appendix A3_Part 16".
ITC Investigation No. 337-744, captioned: "Certain Mobile Devices, Associated Software, and Components Thereof" "Appendix A3_Part 17".
ITC Investigation No. 337-744, captioned: "Certain Mobile Devices, Associated Software, and Components Thereof" "Appendix A3_Part 2".
ITC Investigation No. 337-744, captioned: "Certain Mobile Devices, Associated Software, and Components Thereof" "Appendix A3_Part 3".
ITC Investigation No. 337-744, captioned: "Certain Mobile Devices, Associated Software, and Components Thereof" "Appendix A3_Part 4".
ITC Investigation No. 337-744, captioned: "Certain Mobile Devices, Associated Software, and Components Thereof" "Appendix A3_Part 5".
ITC Investigation No. 337-744, captioned: "Certain Mobile Devices, Associated Software, and Components Thereof" "Appendix A3_Part 6".
ITC Investigation No. 337-744, captioned: "Certain Mobile Devices, Associated Software, and Components Thereof" "Appendix A3_Part 7".
ITC Investigation No. 337-744, captioned: "Certain Mobile Devices, Associated Software, and Components Thereof" "Appendix A3_Part 8".
ITC Investigation No. 337-744, captioned: "Certain Mobile Devices, Associated Software, and Components Thereof" "Appendix A3_Part 9".
ITC Investigation No. 337-744, captioned: "Certain Mobile Devices, Associated Software, and Components Thereof" "Appendix A4_000 Tech Refs Cited in 5579517".
Amendment dated Jan. 5, 2012, in U.S. Appl. No. 11/115,589.
Office Action mailed Sep. 13, 2011, in U.S. Appl. No. 11/115,589.
ITC Investigation No. 337-744, captioned: "Certain Mobile Devices, Associated Software, and Components Thereof" "Complainant Microsoft Corporation's Response to Respondent Motorola Mobility, Inc.'s Petition and Contingent Petition for Review" Jan. 26, 2012.
ITC Investigation No. 337-744, captioned: "Certain Mobile Devices, Associated Software, and Components Thereof" "Summary of Complainant Microsoft Corporation's Response to Respondent Motorola Mobility, Inc.'s Petition and Contingent Petition for Review" Jan. 26, 2012.
ITC Investigation No. 337-744, captioned: "Certain Mobile Devices, Associated Software, and Components Thereof" "Public Version of Respondent Motorola Mobility Inc.'s Summary of response to Complainant Microsoft Corporation's Petition for Review" Jan. 23, 2012.
ITC Investigation No. 337-744, captioned: "Certain Mobile Devices, Associated Software, and Components Thereof" "Jan. 20, 2012[Public] Public Version of Motorola Mobility Inc.'s Response to Petition for Review" Jan. 20, 2012.

(56) References Cited

OTHER PUBLICATIONS

ITC Investigation No. 337-744, captioned: "Certain Mobile Devices, Associated Software, and Components Thereof" "Public Version of Respondent Motorola Mobility Inc.'s Summary of Petition and Contingent Petition for Review" Jan. 2012.
ITC Investigation No. 337-744, captioned: "Certain Mobile Devices, Associated Software, and Components Thereof" "Public Version of Respondent Motorola Mobility Inc.'s Petition and Contingent Petition for Review" Jan. 20, 2012.
ITC Investigation No. 337-744, captioned: "Certain Mobile Devices, Associated Software, and Components Thereof" "Microsoft Corporation's Petition for Review of Initial Determination" Jan. 18, 2012.
ITC Investigation No. 337-744, captioned: "Certain Mobile Devices, Associated Software, and Components Thereof" "Public Version of Microsoft Summary of Petition for Review" Jan. 17, 2012.
ITC Investigation No. 337-744, captioned: "Certain Mobile Devices, Associated Software, and Components Thereof" Dec. 29, 2011.
ITC Investigation No. 337-744, captioned: "Certain Mobile Devices, Associated Software, and Components Thereof" May 21, 2012.
ITC Investigation No. 337-744, captioned: "Certain Mobile Devices, Associated Software, and Components Thereof" May 18, 2012.
ITC Investigation No. 337-744, captioned: "Certain Mobile Devices, Associated Software, and Components Thereof"May 18, 2012.
ITC Investigation No. 337-744, captioned: "Certain Mobile Devices, Associated Software, and Components Thereof" "Complainant Microsoft Corporation's Response to Motorola Mobility's Written Submission in Response to Notice of a Commission Determination to Review a Final Initial Determination in Part" Apr. 6, 2012.
ITC Investigation No. 337-744, captioned: "Certain Mobile Devices, Associated Software, and Components Thereof" Mar. 27, 2012.
ITC Investigation No. 337-744, captioned: "Certain Mobile Devices, Associated Software, and Components Thereof" "Mar. 30, 2012 (Public) Respondent Motorola Mobility Inc's Opening Brief on Commission Review.pdf" Mar. 19, 2012.
ITC Investigation No. 337-744, captioned: "Certain Mobile Devices, Associated Software, and Components Thereof" "Complainant Microsoft Corporation's Written Submission in Response to Notice of Commission Determination to Review a Final Initial Determaion in Part (1 of 2)" Mar. 19, 2012.
ITC Investigation No. 337-744, captioned: "Certain Mobile Devices, Associated Software, and Components Thereof" "Complainant Microsoft Corporation's Written Submission in Response to Notice of Commission Determination to Review a Final Initial Determaion in Part (2 of 2)" Mar. 19, 2012.
ITC Investigation No. 337-744, captioned: "Certain Mobile Devices, Associated Software, and Components Thereof" "Microsoft's Response to Public Interest Statement of Non-Party Google, Inc." Mar. 27, 2012.
ITC Investigation No. 337-744, captioned: "Certain Mobile Devices, Associated Software, and Components Thereof" "Exhibit A" Jun. 13, 2011.
ITC Investigation No. 337-744, captioned: "Certain Mobile Devices, Associated Software, and Components Thereof" "Exhibit B" Aug. 22, 2011.
ITC Investigation No. 337-744, captioned: "Certain Mobile Devices, Associated Software, and Components Thereof" "Exhibit C" Dec. 22, 2011.
ITC Investigation No. 337-744, captioned: "Certain Mobile Devices, Associated Software, and Components Thereof" "Exhibit D" Feb. 27, 2012.
ITC Investigation No. 337-744, captioned: "Certain Mobile Devices, Associated Software, and Components Thereof" "Exhibit E" Nov. 15, 2011.
ITC Investigation No. 337-744, captioned: "Certain Mobile Devices, Associated Software, and Components Thereof" "Exhibit F" Mar. 27, 2012.
ITC Investigation No. 337-744, captioned: "Certain Mobile Devices, Associated Software, and Components Thereof" "Exhibit G" Mar. 27, 2012.
ITC Investigation No. 337-744, captioned: "Certain Mobile Devices, Associated Software, and Components Thereof" "Exhibit H" 2010.
ITC Investigation No. 337-744, captioned: "Certain Mobile Devices, Associated Software, and Components Thereof" "Exhibit I" Sep. 15, 2010.
ITC Investigation No. 337-744, captioned: "Certain Mobile Devices, Associated Software, and Components Thereof" "Exhibit J" May 5, 2011.
ITC Investigation No. 337-744, captioned: "Certain Mobile Devices, Associated Software, and Components Thereof" "Exhibit K" May 8, 2011.
ITC Investigation No. 337-744, captioned: "Certain Mobile Devices, Associated Software, and Components Thereof" "Exhibit L" Aug. 6, 2010.
ITC Investigation No. 337-744, captioned: "Certain Mobile Devices, Associated Software, and Components Thereof" "Exhibit M" May 9, 2011.
ITC Investigation No. 337-744, captioned: "Certain Mobile Devices, Associated Software, and Components Thereof" "Exhibit N" Aug. 16, 2011.
ITC Investigation No. 337-744, captioned: "Certain Mobile Devices, Associated Software, and Components Thereof" "Exhibit O" Jul. 22, 2010.
ITC Investigation No. 337-744, captioned: "Certain Mobile Devices, Associated Software, and Components Thereof" "Exhibit P" Jul. 2011.
ITC Investigation No. 337-744, captioned: "Certain Mobile Devices, Associated Software, and Components Thereof" "Exhibit O" Feb. 16, 2012.
ITC Investigation No. 337-744, captioned: "Certain Mobile Devices, Associated Software, and Components Thereof" Jun. 5, 2012.
ITC Investigation No. 337-744, captioned: "Certain Mobile Devices, Associated Software, and Components Thereof" Docket Report retrieved Jun. 8, 2012.
Amendment dated May 23, 2012, in U.S. Appl. No. 11/115,589.
Amendment dated Aug. 24, 2012, in U.S. Appl. No. 11/115,589.
Office Action mailed Feb. 28, 2012, in U.S. Appl. No. 11/115,589.
Office Action mailed Jun. 1, 2012, in U.S. Appl. No. 11/115,589.
Amendment dated Dec. 13, 2012, in U.S. Appl. No. 11/115,589.
Office Action mailed Sep. 21, 2012, in U.S. Appl. No. 11/115,589.
ITC Investigation No. 337-744, captioned: "Certain Mobile Devices, Associated Software, and Components Thereof" Docket Report retrieved Jun. 27, 2013.
ITC Investigation No. 337-744, captioned: "Certain Mobile Devices, Associated Software, and Components Thereof", Jun. 13, 2012 (2 pages).
ITC Investigation No. 337-744, captioned: "Certain Mobile Devices, Associated Software, and Components Thereof", Jun. 25, 2012 (4 pages).
ITC Investigation No. 337-744, captioned: "Certain Mobile Devices, Associated Software, and Components Thereof", Jul. 19, 2012 (84 pages).
ITC Investigation No. 337-744, captioned: "Certain Mobile Devices, Associated Software, and Components Thereof", Aug. 6, 2012 (1 page).
ITC Investigation No. 337-744, captioned: "Certain Mobile Devices, Associated Software, and Components Thereof", Aug. 27, 2012 (89 pages).
ITC Investigation No. 337-744, captioned: "Certain Mobile Devices, Associated Software, and Components Thereof", Aug. 29, 2012 (3 pages).
ITC Investigation No. 337-744, captioned: "Certain Mobile Devices, Associated Software, and Components Thereof", Sep. 14, 2012 (8 pages).
ITC Investigation No. 337-744, captioned: "Certain Mobile Devices, Associated Software, and Components Thereof", Sep. 14, 2012 (14 pages).
ITC Investigation No. 337-744, captioned: "Certain Mobile Devices, Associated Software, and Components Thereof", Sep. 14, 2012 (2 pages).
ITC Investigation No. 337-744, captioned: "Certain Mobile Devices, Associated Software, and Components Thereof", Oct. 4, 2012 (3 pages).

(56) References Cited

OTHER PUBLICATIONS

ITC Investigation No. 337-744, captioned: "Certain Mobile Devices, Associated Software, and Components Thereof", Oct. 16, 2012 (5 pages).
ITC Investigation No. 337-744, captioned: "Certain Mobile Devices, Associated Software, and Components Thereof", Oct. 16, 2012 (9 pages).
ITC Investigation No. 337-744, captioned: "Certain Mobile Devices, Associated Software, and Components Thereof", Oct. 17, 2012 (pp. 12).
ITC Investigation No. 337-744, captioned: "Certain Mobile Devices, Associated Software, and Components Thereof", Nov. 7, 2012 (4 pages).
ITC Investigation No. 337-744, captioned: "Certain Mobile Devices, Associated Software, and Components Thereof", Jan. 25, 2013 (3 pages).
ITC Investigation No. 337-744, captioned: "Certain Mobile Devices, Associated Software, and Components Thereof", Jan. 30, 2013 (1 page).
ITC Investigation No. 337-744, captioned: "Certain Mobile Devices, Associated Software, and Components Thereof", Mar. 8, 2013 (142 pages).
ITC Investigation No. 337-744, captioned: "Certain Mobile Devices, Associated Software, and Components Thereof", Apr. 5, 2013 (2 pages).
ITC Investigation No. 337-744, captioned: "Certain Mobile Devices, Associated Software, and Components Thereof", Apr. 30, 2013 (3 pages).
ITC Investigation No. 337-744, captioned: "Certain Mobile Devices, Associated Software, and Components Thereof", May 1, 2013 (3 pages).
ITC Investigation No. 337-744, captioned: "Certain Mobile Devices, Associated Software, and Components Thereof", May 13, 2013 (3 pages).
ITC Investigation No. 337-744, captioned: "Certain Mobile Devices, Associated Software, and Components Thereof", May 28, 2013 (3 pages).
ITC Investigation No. 337-744, captioned: "Certain Mobile Devices, Associated Software, and Components Thereof", Jun. 10, 2013 (3 pages).
U.S. Appl. No. 11/115,589, Final Rejection mailed Jan. 9, 2013, 10 pages.
U.S. Appl. No. 11/115,589, Amendment and Response filed May 2, 2013, 9 pages.
U.S. Appl. No. 11/115,589, Advisory Action mailed May 22, 2013, 10 pages.
ITC Investigation No. 337-744, captioned: "Certain Mobile Devices, Associated Software, and Components Thereof" Docket Report retrieved Nov. 4, 2014, 4 pgs.
ITC Investigation No. 337-744, captioned: "Certain Mobile Devices, Associated Software, and Components Thereof", Oct. 15, 2014, 9 pgs.
ITC Investigation No. 337-744, captioned: "Certain Mobile Devices, Associated Software, and Components Thereof", Oct. 16, 2014, 13 pgs.
U.S. Appl. No. 11/115,589, Amendment and Response filed Jul. 2, 2013, 8 pages.
U.S. Appl. No. 11/115,589, Notice of Allowance mailed Oct. 18, 2013, 9 pages.
ITC Investigation No. 337-744, captioned: "Certain Mobile Devices, Associated Software, and Components Thereof", May 17, 2011.
ITC Investigation No. 337-744, captioned: "Certain Mobile Devices, Associated Software, and Components Thereof", Aug. 22, 2011.
ITC Investigation No. 337-744, captioned: "Certain Mobile Devices, Associated Software, and Components Thereof", Aug. 24, 2011.
ITC Investigation No. 337-744, captioned: "Certain Mobile Devices, Associated Software, and Components Thereof" Docket Report retrieved Sep. 1, 2011.
ITC Investigation No. 337-744, captioned: "Certain Mobile Devices, Associated Software, and Components Thereof" Docket Report retrieved Nov. 4, 2013.
ITC Investigation No. 337-744, captioned: "Certain Mobile Devices, Associated Software, and Components Thereof", Sep. 19, 2013 (3 pages).
ITC Investigation No. 337-744, captioned: "Certain Mobile Devices, Associated Software, and Components Thereof" Docket Report retrieved Jul. 14, 2014.
ITC Investigation No. 337-744, captioned: "Certain Mobile Devices, Associated Software, and Components Thereof", Mar. 19, 2014.
ITC Investigation No. 337-744, captioned: "Certain Mobile Devices, Associated Software, and Components Thereof", Apr. 3, 2014.
ITC Investigation No. 337-744, captioned: "Certain Mobile Devices, Associated Software, and Components Thereof", Apr. 4, 2014.
ITC Investigation No. 337-744, captioned: "Certain Mobile Devices, Associated Software, and Components Thereof", Apr. 9, 2014.
ITC Investigation No. 337-744, captioned: "Certain Mobile Devices, Associated Software, and Components Thereof", Apr. 15, 2014.
ITC Investigation No. 337-744, captioned: "Certain Mobile Devices, Associated Software, and Components Thereof", Apr. 21, 2014.
ITC Investigation No. 337-744, captioned: "Certain Mobile Devices, Associated Software, and Components Thereof", Apr. 29, 2014.
ITC Investigation No. 337-744, captioned: "Certain Mobile Devices, Associated Software, and Components Thereof", Apr. 30, 2014.
ITC Investigation No. 337-744, captioned: "Certain Mobile Devices, Associated Software, and Components Thereof", May 5, 2014.
ITC Investigation No. 337-744, captioned: "Certain Mobile Devices, Associated Software, and Components Thereof", May 12, 2014.
ITC Investigation No. 337-744, captioned: "Certain Mobile Devices, Associated Software, and Components Thereof", Jun. 17, 2014.
ITC Investigation No. 337-744, captioned: "Certain Mobile Devices, Associated Software, and Components Thereof", Jun. 18, 2014.
Amended Complaint for Patent Infringement, filed Oct. 6, 2010, in U.S. Dist. Court for the Western District of Washington, CA 2:10-cv-1577-RSM, 9 pgs.
Complaint for Patent Infringment, filed Nov. 10, 2010, in U.S. Dist. Court for the Southern District of Florida, CA 1:10-cv-24063-FAM, 15 pgs.
Defendant Microsoft Corporation's Answer and Counterclaims to Plaintiffs First Amended Complaint for Patent Infringement, filed Jan. 15, 2011, in U.S. Dist. Court for the Western District of Wisconsin, CA No. 3:10-cv-699, 39 pgs.
Defendant Microsoft Corporation's Answer and Counterclaims to Plaintiffs Complaint for Patent Infringement, filed Dec. 23, 2010, in U.S. Dist. Court for the Southern District of Florida, 21 pgs.
First Amended Complaint for Patent Infringement, filed Jan. 11, 2011, in U.S. Dist. Court for the Western District of Wisconsin, CA No. 3:10-cv-699, 13 pgs.
ITC Investigation No. 337-744, captioned: *"Certain Mobile Devices, Associated Software, and Components Thereof" "Appendix B Index"*—Oct. 4, 2010.
ITC Investigation No. 337-744, captioned: *"Certain Mobile Devices, Associated Software, and Components Thereof" "O'Malley Fetch Desk 1993"*.
ITC Investigation No. 337-744, captioned: *"Certain Mobile Devices, Associated Software, and Components Thereof" "Rohan Golden Retriever 1992"*.
ITC Investigation No. 337-744, captioned: *"Certain Mobile Devices, Associated Software, and Components Thereof" "Trivette Utility 60 Char 1988"*.
ITC Investigation No. 337-744, captioned: *"Certain Mobile Devices, Associated Software, and Components Thereof" "Wang Universal File 1990"*.
ITC Investigation No. 337-744, captioned: *"Certain Mobile Devices, Associated Software, and Components Thereof" "Tech Refs Cited"*—Filed Oct. 4, 2010.
ITC Investigation No. 337-744, captioned: *"Certain Mobile Devices, Associated Software, and Components Thereof" "Appendix B Index"*—Filed Oct. 4, 2010.
ITC Investigation No. 337-744, captioned: *"Certain Mobile Devices, Associated Software, and Components Thereof" "Software Sherlock 2.0, 1998"*.

(56) References Cited

OTHER PUBLICATIONS

ITC Investigation No. 337-744, captioned: "*Certain Mobile Devices, Associated Software, and Components Thereof*" "*Acerson WordPerfect 5.1 1990*".
ITC Investigation No. 337-744, captioned: "*Certain Mobile Devices, Associated Software, and Components Thereof*" "*Allen Vices and Virtues 1993*".
ITC Investigation No. 337-744, captioned: "*Certain Mobile Devices, Associated Software, and Components Thereof*" "*Almax Software Longer Filenames for DOS 1993*".
ITC Investigation No. 337-744, captioned: "*Certain Mobile Devices, Associated Software, and Components Thereof*" "*Baird Benefits 4DOS 1993*".
ITC Investigation No. 337-744, captioned: "*Certain Mobile Devices, Associated Software, and Components Thereof*" "*Berst Come Closer 1993*".
ITC Investigation No. 337-744, captioned: "*Certain Mobile Devices, Associated Software, and Components Thereof*" "*Beta Systems DOS History 2003*".
ITC Investigation No. 337-744, captioned: "*Certain Mobile Devices, Associated Software, and Components Thereof*" "*Blackwell WSC Launches Extend 199*".
ITC Investigation No. 337-744, captioned: "*Certain Mobile Devices, Associated Software, and Components Thereof*" "*Bonner Build a Doc 1992*".
ITC Investigation No. 337-744, captioned: "*Certain Mobile Devices, Associated Software, and Components Thereof*" "*Bonner GeoWorks 1990*".
ITC Investigation No. 337-744, captioned: "*Certain Mobile Devices, Associated Software, and Components Thereof*""*Bonner Whats in 1988*".
ITC Investigation No. 337-744, captioned: "*Certain Mobile Devices, Associated Software, and Components Thereof*" "*Bonner Windows 3.1 1992*".
ITC Investigation No. 337-744, captioned: "*Certain Mobile Devices, Associated Software, and Components Thereof*" "*Busch 4DOS 1992*".
ITC Investigation No. 337-744, captioned: "*Certain Mobile Devices, Associated Software, and Components Thereof*" "*Capen Ultimate File Manager 1993*".
ITC Investigation No. 337-744, captioned: "*Certain Mobile Devices, Associated Software, and Components Thereof*" "*Chin Using Unused Bytes 1991*".
ITC Investigation No. 337-744, captioned: "*Certain Mobile Devices, Associated Software, and Components Thereof*" "*Clark Proposed DOS 1993*".
ITC Investigation No. 337-744, captioned: "*Certain Mobile Devices, Associated Software, and Components Thereof*" "*Cluts Making Room 1996*".
ITC Investigation No. 337-744, captioned: "*Certain Mobile Devices, Associated Software, and Components Thereof*" "*Comer the Tilde 1986*".
ITC Investigation No. 337-744, captioned: "*Certain Mobile Devices, Associated Software, and Components Thereof*" "*Comm Rule 51(4) EPC 2000*".
ITC Investigation No. 337-744, captioned: "*Certain Mobile Devices, Associated Software, and Components Thereof*" "*Crow Encapsulation of Applications 1989*".
ITC Investigation No. 337-744, captioned: "Certain Mobile Devices, Associated Software, and Components Thereof" "*Dateline Gold Retr 2.0b 1993*".
ITC Investigation No. 337-744, captioned: "*Certain Mobile Devices, Associated Software, and Components Thereof*" "*Dateline the Intell Way 1987*".
ITC Investigation No. 337-744, captioned: "*Certain Mobile Devices, Associated Software, and Components Thereof*" "*Davis NT No Thanks 1993*".
ITC Investigation No. 337-744, captioned: "*Certain Mobile Devices, Associated Software, and Components Thereof*" "*Derfler Build Workgroup Sol 1988*".
ITC Investigation No. 337-744, captioned: "*Certain Mobile Devices, Associated Software, and Components Thereof*" "*DeVoney NT Has Arrived 1993*".
ITC Investigation No. 337-744, captioned: "*Certain Mobile Devices, Associated Software, and Components Thereof*" "*Dig Res Intr ROM 1998*".
ITC Investigation No. 337-744, captioned: "*Certain Mobile Devices, Associated Software, and Components Thereof*" "*Duncan Comparing DOS 1989*".
ITC Investigation No. 337-744, captioned: "*Certain Mobile Devices, Associated Software, and Components Thereof*" "*Duncan Des Goals 1989*".
ITC Investigation No. 337-744, captioned: "*Certain Mobile Devices, Associated Software, and Components Thereof*" "*Duncan Getting Acquainted Prt 1 1990*".
ITC Investigation No. 337-744, captioned: "*Certain Mobile Devices, Associated Software, and Components Thereof*" "*Duncan Getting Acquainted Prt 2 1990*".
ITC Investigation No. 337-744, captioned: "*Certain Mobile Devices, Associated Software, and Components Thereof*" "*Duncan Using Long File Names Prt 1 1990*".
ITC Investigation No. 337-744, captioned: "*Certain Mobile Devices, Associated Software, and Components Thereof*" "*Duncan Using Long File Names Prt 2 1990*".
ITC Investigation No. 337-744, captioned: "*Certain Mobile Devices, Associated Software, and Components Thereof*" "*CD-Rom Rock Ridge Group 1991*".
ITC Investigation No. 337-744, captioned: "*Certain Mobile Devices, Associated Software, and Components Thereof*" "*Florida Sun Flash Rock Ridge Prel CD-ROM Specs 1991*".
ITC Investigation No. 337-744, captioned: "*Certain Mobile Devices, Associated Software, and Components Thereof*" "*Fowler Cross Talking 1993*".
ITC Investigation No. 337-744, captioned: "*Certain Mobile Devices, Associated Software, and Components Thereof*" "*Freed High End 1992*".
ITC Investigation No. 337-744, captioned: "*Certain Mobile Devices, Associated Software, and Components Thereof*" "*Fuchs DOS FAQ 2004*".
ITC Investigation No. 337-744, captioned: "*Certain Mobile Devices, Associated Software, and Components Thereof*" "*Giovetti Way You Work 1992*".
ITC Investigation No. 337-744, captioned: "Certain Mobile Devices, Associated Software, and Components Thereof" "Appendix A Index—CD 2 of 5"—Filed Oct. 4, 2010.
ITC Investigation No. 337-744, captioned: "Certain Mobile Devices, Associated Software, and Components Thereof" "Appendix A4_013 Duncan Des Goals 1989".
ITC Investigation No. 337-744, captioned: "Certain Mobile Devices, Associated Software, and Components Thereof""Appendix A4_014 Duncan Using Long File Names Prt 1 1990".
ITC Investigation No. 337-744, captioned: "Certain Mobile Devices, Associated Software, and Components Thereof" "Appendix A4_015.Duncan Using Long File Names Prt 2 1990".
ITC Investigation No. 337-744, captioned: "Certain Mobile Devices, Associated Software, and Components Thereof" "Appendix A4_016 Leffler 4.3BSD Unix 1989".
ITC Investigation No. 337-744, captioned: "Certain Mobile Devices, Associated Software, and Components Thereof" "Appendix A4_017 Wang Universal File 1990".
ITC Investigation No. 337-744, captioned: "Certain Mobile Devices, Associated Software, and Components Thereof" "Appendix A4_018 WSC Extend-A-Name 1988".
ITC Investigation No. 337-744, captioned: "Certain Mobile Devices, Associated Software, and Components Thereof" "Appendix A5 Tech Refs Cover"—Filed Oct. 4, 2010.
ITC Investigation No. 337-744, captioned: "Certain Mobile Devices, Associated Software, and Components Thereof" "Appendix A5_055 2010 Software Sherlock 2.0 1998".
ITC Investigation No. 337-744, captioned: "Certain Mobile Devices, Associated Software, and Components Thereof" "Appendix A5_056 Acerson WordPerfect 5.1 1990".

(56) References Cited

OTHER PUBLICATIONS

ITC Investigation No. 337-744, captioned: "Certain Mobile Devices, Associated Software, and Components Thereof" Doc. No. 585093-43489726 "Appendix A5_057 Allen Vices and Virtues 1993".
ITC Investigation No. 337-744, captioned: "Certain Mobile Devices, Associated Software, and Components Thereof" "Appendix A5_058 Almax Sftwr Longer Filenames for DOS"—Filed Oct. 4, 2010.
ITC Investigation No. 337-744, captioned: "Certain Mobile Devices, Associated Software, and Components Thereof" "Appendix A5_059 Baird Benefits 4DOS"—Filed Oct. 4, 2010.
ITC Investigation No. 337-744, captioned: "Certain Mobile Devices, Associated Software, and Components Thereof" "Appendix A5_060 Berst Come Closer"—Filed Oct. 4, 2010.
ITC Investigation No. 337-744, captioned: "Certain Mobile Devices, Associated Software, and Components Thereof" "Appendix A5_061 Beta Systems Dos History"—Filed Oct. 4, 2010.
ITC Investigation No. 337-744, captioned: "Certain Mobile Devices, Associated Software, and Components Thereof" "Appendix A5_062 Blackwell WSC Launches Extend 1990".
ITC Investigation No. 337-744, captioned: "Certain Mobile Devices, Associated Software, and Components Thereof" "Appendix A5_063 Bonner Build a Doc"—Filed Oct. 4, 2010.
ITC Investigation No. 337-744, captioned: "Certain Mobile Devices, Associated Software, and Components Thereof" "Appendix A5_064 Bonner GeoWorks"—Filed Oct. 4, 2010.
ITC Investigation No. 337-744, captioned: "Certain Mobile Devices, Associated Software, and Components Thereof" "Appendix A5_065 Bonner Whats in 1988"—Filed Oct. 4, 2010.
ITC Investigation No. 337-744, captioned: "Certain Mobile Devices, Associated Software, and Components Thereof" "Appendix A5_066 Bonner Windows 3.1"—Filed Oct. 4, 2010.
ITC Investigation No. 337-744, captioned: "Certain Mobile Devices, Associated Software, and Components Thereof" "Appendix A5_067 Busch 4DOS"—Filed Oct. 4, 2010.
ITC Investigation No. 337-744, captioned: "Certain Mobile Devices, Associated Software, and Components Thereof" "Appendix A5_068 Capen Ultimate File Manager"—Filed Oct. 4, 2010.
ITC Investigation No. 337-744, captioned: "Certain Mobile Devices, Associated Software, and Components Thereof" "Appendix A5_069 Chin Using Unused Bytes"—Filed Oct. 4, 2010.
ITC Investigation No. 337-744, captioned: "Certain Mobile Devices, Associated Software, and Components Thereof" "Appendix A5_070 Clark Proposed DOS"—Filed Oct. 4, 2010.
ITC Investigation No. 337-744, captioned: "Certain Mobile Devices, Associated Software, and Components Thereof" "Appendix A5_071 Cluts Making Room"—Filed Oct. 4, 2010.
ITC Investigation No. 337-744, captioned: "Certain Mobile Devices, Associated Software, and Components Thereof" "Appendix A5_072 Comer the Tilde"—Filed Oct. 4, 2010.
ITC Investigation No. 337-744, captioned: "Certain Mobile Devices, Associated Software, and Components Thereof" "Appendix A5_073 Comm Rule 51_4 EPC" (EP Appl. No. 94105169.0)—Filed Oct. 4, 2010.
ITC Investigation No. 337-744, captioned: "Certain Mobile Devices, Associated Software, and Components Thereof" "Appendix A5_074 Crow Encapsulation of Applications"—Filed Oct. 4, 2010.
ITC Investigation No. 337-744, captioned: "Certain Mobile Devices, Associated Software, and Components Thereof" "Appendix A5_075 Dateline Gold Retr 2.0b 1993".
ITC Investigation No. 337-744, captioned: "Certain Mobile Devices, Associated Software, and Components Thereof" "Appendix A5_076 Dateline the Intell Way 1987".
ITC Investigation No. 337-744, captioned: "Certain Mobile Devices, Associated Software, and Components Thereof" "Appendix A5_077 Davis NT No Thanks 1993".
ITC Investigation No. 337-744, captioned: "Certain Mobile Devices, Associated Software, and Components Thereof" "Appendix A5_078 Derfler Build Workgroup Sol 1988".
ITC Investigation No. 337-744, captioned: "Certain Mobile Devices, Associated Software, and Components Thereof" "Appendix A5_079 DeVoney NT Has Arrived 1993".
ITC Investigation No. 337-744, captioned: "Certain Mobile Devices, Associated Software, and Components Thereof" "Appendix A5_080 Dig Res Intr Rom 1988".
ITC Investigation No. 337-744, captioned: "Certain Mobile Devices, Associated Software, and Components Thereof" "Appendix B Index-CD 1 of 5"—Filed Oct. 4, 2010.
ITC Investigation No. 337-744, captioned: "Certain Mobile Devices, Associated Software, and Components Thereof" "Appendix B1"—Filed Oct. 4, 2010.
ITC Investigation No. 337-744, captioned: "Certain Mobile Devices, Associated Software, and Components Thereof" "Appendix B1_Part 1"—Filed Oct. 4, 2010.
ITC Investigation No. 337-744, captioned: "Certain Mobile Devices, Associated Software, and Components Thereof" "Appendix B1_Part 2"—Filed Oct. 4, 2010.
ITC Investigation No. 337-744, captioned: "Certain Mobile Devices, Associated Software, and Components Thereof" "Appendix B1_Part 3"—Filed Oct. 4, 2010.
ITC Investigation No. 337-744, captioned: "Certain Mobile Devices, Associated Software, and Components Thereof" "Appendix B1_Part 4"—Filed Oct. 4, 2010.
ITC Investigation No. 337-744, captioned: "Certain Mobile Devices, Associated Software, and Components Thereof" "Appendix B2"—Filed Oct. 4, 2010.
ITC Investigation No. 337-744, captioned: "Certain Mobile Devices, Associated Software, and Components Thereof" "Appendix B2_Part 1"—Filed Oct. 4, 2010.
ITC Investigation No. 337-744, captioned: "Certain Mobile Devices, Associated Software, and Components Thereof" "Appendix B2_Part 2"—Filed Oct. 4, 2010.
ITC Investigation No. 337-744, captioned: "Certain Mobile Devices, Associated Software, and Components Thereof" "Appendix B2_Part 3"—Filed Oct. 4, 2010.
ITC Investigation No. 337-744, captioned: "Certain Mobile Devices, Associated Software, and Components Thereof" "Appendix B2_Part 4"—Filed Oct. 4, 2010.
ITC Investigation No. 337-744, captioned: "Certain Mobile Devices, Associated Software, and Components Thereof" "Appendix B3_000.Tech Refs Cited in 5758352"—Filed Oct. 4, 2010.
ITC Investigation No. 337-744, captioned: "Certain Mobile Devices, Associated Software, and Components Thereof" "Appendix B3_021 Blackwell WSC Launches Extend 1990".
ITC Investigation No. 337-744, captioned: "Certain Mobile Devices, Associated Software, and Components Thereof" "Appendix B3_022 Bonner Build a Doc 1991".
ITC Investigation No. 337-744, captioned: "Certain Mobile Devices, Associated Software, and Components Thereof" "Appendix B3-023 Bonner Whats in a Name"—Filed Oct. 4, 2010.
ITC Investigation No. 337-744, captioned: "Certain Mobile Devices, Associated Software, and Components Thereof" "Appendix B3_024 Dateline Gold Retr 2.0b 1993".
ITC Investigation No. 337-744, captioned: "Certain Mobile Devices, Associated Software, and Components Thereof" "Appendix B3_025.Dateline the Intell Way 1987".
ITC Investigation No. 337-744, captioned: "Certain Mobile Devices, Associated Software, and Components Thereof" "Appendix B3_026 duncan Des Goals 1989".
ITC Investigation No. 337-744, captioned: "Certain Mobile Devices, Associated Software, and Components Thereof" "Appendix B3_027 Duncan Using Long File Names Prt 1 1990".
ITC Investigation No. 337-744, captioned: "Certain Mobile Devices, Associated Software, and Components Thereof" "Appendix B3_028 Duncan Using Long File Names Prt 2 1990".
ITC Investigation No. 337-744, captioned: "Certain Mobile Devices, Associated Software, and Components Thereof" "Appendix B3_029 Glass Create Own Env 1990".
ITC Investigation No. 337-744, captioned: "Certain Mobile Devices, Associated Software, and Components Thereof" "Appendix B3_030 Hurwicz MS-DOS 3.1 1985".

(56) References Cited

OTHER PUBLICATIONS

ITC Investigation No. 337-744, captioned: "Certain Mobile Devices, Associated Software, and Components Thereof" "Appendix B3_031 Leffler 4 3BSD UNIX 1989".
ITC Investigation No. 337-744, captioned: "Certain Mobile Devices, Associated Software, and Components Thereof" "Appendix B3_032 Lent New Improv Wind 1993".
ITC Investigation No. 337-744, captioned: "Certain Mobile Devices, Associated Software, and Components Thereof" "Appendix B3_033 Mallory DOS Filename 1993".
ITC Investigation No. 337-744, captioned: "Certain Mobile Devices, Associated Software, and Components Thereof" "Appendix B3_034 McCormick Present MGR 1990".
ITC Investigation No. 337-744, captioned: "Certain Mobile Devices, Associated Software, and Components Thereof" "Appendix B3_035 Microsoft File Sharing Protocol 1988".
ITC Investigation No. 337-744, captioned: "Certain Mobile Devices, Associated Software, and Components Thereof" "Appendix B Index-CD 4 of 5"—Filed Oct. 4, 2010.
ITC Investigation No. 337-744, captioned: "Certain Mobile Devices, Associated Software, and Components Thereof" "Appendix B4_094 Glass Create Own PC ENV 1990".
ITC Investigation No. 337-744, captioned: "Certain Mobile Devices, Associated Software, and Components Thereof" "Appendix B4_095 Goh MS DOS 6.0 1993".
ITC Investigation No. 337-744, captioned: "Certain Mobile Devices, Associated Software, and Components Thereof" "Appendix B4_096 Gralla Factors Impeding OS2 1989".
ITC Investigation No. 337-744, captioned: "Certain Mobile Devices, Associated Software, and Components Thereof" "Appendix B4_097 Gralla Shareware 1992".
ITC Investigation No. 337-744, captioned: "Certain Mobile Devices, Associated Software, and Components Thereof" "Appendix B4_098 Greenberg Compress and Exp 1989".
ITC Investigation No. 337-744, captioned: "Certain Mobile Devices, Associated Software, and Components Thereof" "Appendix B4_099 Hall Overview of FreeDOS 2002".
ITC Investigation No. 337-744, captioned: "Certain Mobile Devices, Associated Software, and Components Thereof" "Appendix B4_100 Hayes Making CD-ROM Usable 1991".
ITC Investigation No. 337-744, captioned: "Certain Mobile Devices, Associated Software, and Components Thereof" "Appendix B4_101 Hotch Will This Be 1992".
ITC Investigation No. 337-744, captioned: "Certain Mobile Devices, Associated Software, and Components Thereof" "Appendix B4_102 Hurwicz MS-DOS 3.1 1985".
ITC Investigation No. 337-744, captioned: "Certain Mobile Devices, Associated Software, and Components Thereof" "Appendix B4_103 Idol Sherlock 193"—Filed Oct. 4, 2010.
ITC Investigation No. 337-744, captioned: "Certain Mobile Devices, Associated Software, and Components Thereof" "Appendix B4—104 Jackson Apple Talk 1990".
ITC Investigation No. 337-744, captioned: "Certain Mobile Devices, Associated Software, and Components Thereof" "Appendix B4_105 Jeffries What's Ahead 1985".
ITC Investigation No. 337-744, captioned: "Certain Mobile Devices, Associated Software, and Components Thereof" "Appendix B4_106 JH 20Years of DOS History 2005".
ITC Investigation No. 337-744, captioned: "Certain Mobile Devices, Associated Software, and Components Thereof" "Appendix B4_107 Lang Translation of Pit's Boese LTR 2004".
ITC Investigation No. 337-744, captioned: "Certain Mobile Devices, Associated Software, and Components Thereof" "Appendix B4_108 Leffler 4.3BSD UNIX 1989".
ITC Investigation No. 337-744, captioned: "Certain Mobile Devices, Associated Software, and Components Thereof" "Appendix B4_109 Lent New Improv Wind 1993".
ITC Investigation No. 337-744, captioned: "Certain Mobile Devices, Associated Software, and Components Thereof" "Appendix B4_110 Lewallen the NT Desktop 1993".
ITC Investigation No. 337-744, captioned: "Certain Mobile Devices, Associated Software, and Components Thereof" "Appendix B4_111 Lincoln Death to 83 Filenames 1993".
ITC Investigation No. 337-744, captioned: "Certain Mobile Devices, Associated Software, and Components Thereof" "Appendix B4_112 Mallory DOS filename 1993".
ITC Investigation No. 337-744, captioned: "Certain Mobile Devices, Associated Software, and Components Thereof" "Appendix B4_113 Manes Taking a Gamble 1984".
ITC Investigation No. 337-744, captioned: "Certain Mobile Devices, Associated Software, and Components Thereof" "Appendix B4_114 Mathisen Novell's DOS 7 1994".
ITC Investigation No. 337-744, captioned: "Certain Mobile Devices, Associated Software, and Components Thereof" "Appendix B4_115 Matthias 25 Years of DOS 2000".
ITC Investigation No. 337-744, captioned: "Certain Mobile Devices, Associated Software, and Components Thereof" "Appendix B4_116 McCormick Present Mgr 1990".
ITC Investigation No. 337-744, captioned: "Certain Mobile Devices, Associated Software, and Components Thereof" "Appendix B4_117 Mefford Adding Notes 1987".
ITC Investigation No. 337-744, captioned: "Certain Mobile Devices, Associated Software, and Components Thereof" "Appendix B4_118 Merkal Ansp 1 Ex. 5 of Ref"—Filed Oct. 4, 2010.
ITC Investigation No. 337-744, captioned: "Certain Mobile Devices, Associated Software, and Components Thereof" "Appendix B4_119 Merkmal Ansp 12 Ex. 6 of Ref"—Filed Oct. 4, 2010.
ITC Investigation No. 337-744, captioned: "Certain Mobile Devices, Associated Software, and Components Thereof" Appendix B4_120 Microsoft App C—LAN Mgr Macintosh 1991 (Missing p. 122).
ITC Investigation No. 337-744, captioned: "Certain Mobile Devices, Associated Software, and Components Thereof" "Appendix B4_122 Microsoft Common Name Ex. 15 1994".
ITC Investigation No. 337-744, captioned: "Certain Mobile Devices, Associated Software, and Components Thereof" "Appendix B4_123 Microsoft File sharing Protocol 1988".
ITC Investigation No. 337-744, captioned: "Certain Mobile Devices, Associated Software, and Components Thereof" "Appendix B4_125 Neuhaus Databases 1990".
ITC Investigation No. 337-744, captioned: "Certain Mobile Devices, Associated Software, and Components Thereof" "Appendix B4_126 Newsgroups Ex. 7a of Ref 1992".
ITC Investigation No. 337-744, captioned: "Certain Mobile Devices, Associated Software, and Components Thereof" "Appendix B4_127 Newsgroups Ex. 7b of Ref 1991".
ITC Investigation No. 337-744, captioned: "Certain Mobile Devices, Associated Software, and Components Thereof" "Appendix B4_128 Newsgroups Ex. 7c of Ref 1991".
ITC Investigation No. 337-744, captioned: "Certain Mobile Devices, Associated Software, and Components Thereof" "Appendix B4_129 Newsgroups Ex. 7d of Ref 1992".
ITC Investigation No. 337-744, captioned: "Certain Mobile Devices, Associated Software, and Components Thereof" "Appendix B4_130 Nilsson Sherlock Solves 1993".
ITC Investigation No. 337-744, captioned: "Certain Mobile Devices, Associated Software, and Components Thereof" "Appendix B4_131 Olson Student Writes Free Ods 1994".
ITC Investigation No. 337-744, captioned: "Certain Mobile Devices, Associated Software, and Components Thereof" "Appendix B4_132 OMalley Fetch Desk 1993".
ITC Investigation No. 337-744, captioned: "Certain Mobile Devices, Associated Software, and Components Thereof" "Appendix B4_133 PC Guide File Allocation Tables 2001".
ITC Investigation No. 337-744, captioned: "Certain Mobile Devices, Associated Software, and Components Thereof" "Appendix B4_134 Petzold 1989 the Year in Oper Sys 1990".
ITC Investigation No. 337-744, captioned: "Certain Mobile Devices, Associated Software, and Components Thereof" "Appendix B4_135 Petzold OS-2 a New Beg 1988".
ITC Investigation No. 337-744, captioned: "Certain Mobile Devices, Associated Software, and Components Thereof" "Appendix B4_136 Prosise Retrofitting 1986".

(56) References Cited

OTHER PUBLICATIONS

ITC Investigation No. 337-744, captioned: "Certain Mobile Devices, Associated Software, and Components Thereof" "Appendix B4_137 Prosise Tutor 1992".
ITC Investigation No. 337-744, captioned: "Certain Mobile Devices, Associated Software, and Components Thereof" "Appendix B4_138 Proteo Master Their PCs 1991".
ITC Investigation No. 337-744, captioned: "Certain Mobile Devices, Associated Software, and Components Thereof" "Appendix B4_139 Response to Office Comm. 2000".
ITC Investigation No. 337-744, captioned: "Certain Mobile Devices, Associated Software, and Components Thereof" "Appendix B4_140 Rettig Custom Windows 1993".
ITC Investigation No. 337-744, captioned: "Certain Mobile Devices, Associated Software, and Components Thereof" "Appendix B4_141 Rizzo Disks of Duff Color 1991".
ITC Investigation No. 337-744, captioned: "Certain Mobile Devices, Associated Software, and Components Thereof" "Appendix B4_142 Rock Ridge Prot Vers. 1.09 1991".
ITC Investigation No. 337-744, captioned: "Certain Mobile Devices, Associated Software, and Components Thereof" "Appendix B Index-CD 5 of 5"—Filed Oct. 4, 2010.
ITC Investigation No. 337-744, captioned: "Certain Mobile Devices, Associated Software, and Components Thereof" "Appendix B4_143 Rohan Golden Retriever 1992".
ITC Investigation No. 337-744, captioned: "Certain Mobile Devices, Associated Software, and Components Thereof" "Appendix B4_144 Ruley Feature-Rich Beta 1992".
ITC Investigation No. 337-744, captioned: "Certain Mobile Devices, Associated Software, and Components Thereof" "Appendix B4_145 Saiedian Frame for Assessment 1996".
ITC Investigation No. 337-744, captioned: "Certain Mobile Devices, Associated Software, and Components Thereof' Appendix B4_146 Sanders the $RO 1987.
ITC Investigation No. 337-744, captioned: "Certain Mobile Devices, Associated Software, and Components Thereof" "Appendix B4_147 Simon What You Can Do 1991".
ITC Investigation No. 337-744, captioned: "Certain Mobile Devices, Associated Software, and Components Thereof" "Appendix B4_148 Smith OS-2 2.0 does the Job 1992".
ITC Investigation No. 337-744, captioned: "Certain Mobile Devices, Associated Software, and Components Thereof" "Appendix B4_149 Sobell Practice Guide Unix 1989".
ITC Investigation No. 337-744, captioned: "Certain Mobile Devices, Associated Software, and Components Thereof" "Appendix B4_150 Somerson DOS 5.0 1991".
ITC Investigation No. 337-744, captioned: "Certain Mobile Devices, Associated Software, and Components Thereof" "Appendix B4_151 Somerson Spy-Proof 1992".
ITC Investigation No. 337-744, captioned: "Certain Mobile Devices, Associated Software, and Components Thereof" "Appendix B4_152 Styer disks 1997".
ITC Investigation No. 337-744, captioned: "Certain Mobile Devices, Associated Software, and Components Thereof" "Appendix B4_153 Tanenbaum Modern OS 2001".
ITC Investigation No. 337-744, captioned: "Certain Mobile Devices, Associated Software, and Components Thereof" "Appendix B4_154 Trivette Utility 60 Char 1988".
ITC Investigation No. 337-744, captioned: "Certain Mobile Devices, Associated Software, and Components Thereof" "Appendix B4_155 vinDaci Long Filename Spec 1998".
ITC Investigation No. 337-744, captioned: "Certain Mobile Devices, Associated Software, and Components Thereof" "Appendix B4_156 Wagner Developers Tour of Chicago 1993".
ITC Investigation No. 337-744, captioned: "Certain Mobile Devices, Associated Software, and Components Thereof" "Appendix B4_157 Wang Universal File 1990".
ITC Investigation No. 337-744, captioned: "Certain Mobile Devices, Associated Software, and Components Thereof" "Appendix B4_158 Wendin Wendin DOS 1987".
ITC Investigation No. 337-744, captioned: "Certain Mobile Devices, Associated Software, and Components Thereof" "Appendix B4_159 wikipedia Comparison of FS 2005".
ITC Investigation No. 337-744, captioned: "Certain Mobile Devices, Associated Software, and Components Thereof" "Appendix B4_160 Wikipedia DOS 2005".
ITC Investigation No. 337-744, captioned: "Certain Mobile Devices, Associated Software, and Components Thereof" "Appendix B4_162 Windows Mag Access Review 1993".
ITC Investigation No. 337-744, captioned: "Certain Mobile Devices, Associated Software, and Components Thereof" "Appendix B4_163 Winship DOS Shells 1990".
ITC Investigation No. 337-744, captioned: "Certain Mobile Devices, Associated Software, and Components Thereof" "Appendix B4_164 WSC Extend-A-Name 1988".
ITC Investigation No. 337-744, captioned: "Certain Mobile Devices, Associated Software, and Components Thereof" "Appendix B4_165 Young CD-Rom Stand 1991".
ITC Investigation No. 337-744, captioned: "Certain Mobile Devices, Associated Software, and Components Thereof" "Appendix B4_166 Zelnick Way You Work 1991".
ITC Investigation No. 337-744, captioned: "Certain Mobile Devices, Associated Software, and Components Thereof" "Appendix B4-124"—Filed Oct. 4, 2010.
ITC Investigation No. 337-744, captioned: "Certain Mobile Devices, Associated Software, and Components Thereof" "Appendix B4-161"—Filed Oct. 4, 2010.
ITC Investigation No. 337-744, captioned: "Certain Mobile Devices, Associated Software, and Components Thereof" "Appendix A Index—CD 4 of 5"—Filed Oct. 4, 2010.
ITC Investigation No. 337-744, captioned: "Certain Mobile Devices, Associated Software, and Components Thereof" "Appendix A4_081 Duncan Comparing Ods 1989".
ITC Investigation No. 337-744, captioned: "Certain Mobile Devices, Associated Software, and Components Thereof" "Appendix A4_082 Duncan Des goals 1989".
ITC Investigation No. 337-744, captioned: "Certain Mobile Devices, Associated Software, and Components Thereof" "Appendix A4_083 Duncan Getting Acquainted Prt 1 1990".
ITC Investigation No. 337-744, captioned: "Certain Mobile Devices, Associated Software, and Components Thereof" "Appendix A4_084 Duncan Getting Acquainted Prt 2 1990".
ITC Investigation No. 337-744, captioned: "Certain Mobile Devices, Associated Software, and Components Thereof" "Appendix A4_085 Duncan Using Long File Names Prt 1 1990".
ITC Investigation No. 337-744, captioned: "Certain Mobile Devices, Associated Software, and Components Thereof" "Appendix A4_086 Duncan Using Long File Names Prt 2 1990".
ITC Investigation No. 337-744, captioned: "Certain Mobile Devices, Associated Software, and Components Thereof" "Appendix A4_087 Edge CD-Rom Rock Ridge Group 1991".
ITC Investigation No. 337-744, captioned: "Certain Mobile Devices, Associated Software, and Components Thereof" "Appendix A4_088 Florida Sun Flash Rock Ridge Prel CD-ROM Specs 1991".
ITC Investigation No. 337-744, captioned: "Certain Mobile Devices, Associated Software, and Components Thereof" "Appendix A4_089 Fowler Cross Talking 1993".
ITC Investigation No. 337-744, captioned: "Certain Mobile Devices, Associated Software, and Components Thereof" "Appendix A4_090 Freed High End 1992".
ITC Investigation No. 337-744, captioned: "Certain Mobile Devices, Associated Software, and Components Thereof" "Appendix A4_091 Fuchs DOS FAQ 2004".
ITC Investigation No. 337-744, captioned: "Certain Mobile Devices, Associated Software, and Components Thereof" "Appendix A4_092 Giovetti Way You Work 1992".
ITC Investigation No. 337-744, captioned: "Certain Mobile Devices, Associated Software, and Components Thereof" "Appendix A4_093 Glass Create Own PC Env 1990".
ITC Investigation No. 337-744, captioned: "Certain Mobile Devices, Associated Software, and Components Thereof" "Appendix A4_094 Goh MS DOS 6.0 1993".

(56) References Cited

OTHER PUBLICATIONS

ITC Investigation No. 337-744, captioned: "Certain Mobile Devices, Associated Software, and Components Thereof" "Appendix A4_095 Gralla Factors Impeding OS2 1989".
ITC Investigation No. 337-744, captioned: "Certain Mobile Devices, Associated Software, and Components Thereof" "Appendix A4_096 Gralla Shareware 1992".
ITC Investigation No. 337-744, captioned: "Certain Mobile Devices, Associated Software, and Components Thereof" "Appendix A4_097 Greenberg Compress and Exp 1989".
ITC Investigation No. 337-744, captioned: "Certain Mobile Devices, Associated Software, and Components Thereof" "Appendix A4_098 Hall Overview of FreeDOS 2002".
ITC Investigation No. 337-744, captioned: "Certain Mobile Devices, Associated Software, and Components Thereof" "Appendix A4_099 Hayes Making CD-ROM Usable 1991".
ITC Investigation No. 337-744, captioned: "Certain Mobile Devices, Associated Software, and Components Thereof" "Appendix A4_100 Hotch Will This Be 1992".
ITC Investigation No. 337-744, captioned: "Certain Mobile Devices, Associated Software, and Components Thereof" "Appendix A4_101 Hurwicz MS-DOS 3.1 1985".
ITC Investigation No. 337-744, captioned: "Certain Mobile Devices, Associated Software, and Components Thereof" "Appendix A4_102 Idol Sherlock 1993".
ITC Investigation No. 337-744, captioned: "Certain Mobile Devices, Associated Software, and Components Thereof" "Appendix A4_103 Jackson Apple Talk 1990".
ITC Investigation No. 337-744, captioned: "Certain Mobile Devices, Associated Software, and Components Thereof" "Appendix A4_104 Jeffries What's Ahead 1985".
ITC Investigation No. 337-744, captioned: "Certain Mobile Devices, Associated Software, and Components Thereof" "Appendix A4_105 Jh 20 Years of DOS History 2005".
ITC Investigation No. 337-744, captioned: "Certain Mobile Devices, Associated Software, and Components Thereof" "Appendix A4_106 Lang Translation of Plts Boese Ltr 2004".
ITC Investigation No. 337-744, captioned: "Certain Mobile Devices, Associated Software, and Components Thereof" "Appendix A4_107 Leffler 4.3BSD Unix 1989".
ITC Investigation No. 337-744, captioned: "Certain Mobile Devices, Associated Software, and Components Thereof" "Appendix A4_108 Lent New Improv Wind 1993".
ITC Investigation No. 337-744, captioned: "Certain Mobile Devices, Associated Software, and Components Thereof" "Appendix A4_109 Lewallen the NT Desktop 1993".
ITC Investigation No. 337-744, captioned: "Certain Mobile Devices, Associated Software, and Components Thereof" "Appendix A4_110 Lincoln Death to Filenames 1993".
ITC Investigation No. 337-744, captioned: "Certain Mobile Devices, Associated Software, and Components Thereof" "Appendix A4_111 Mallory DOS Filename 1993".
ITC Investigation No. 337-744, captioned: "Certain Mobile Devices, Associated Software, and Components Thereof" "Appendix A4_112 Manes Taking a Gamble 1984".
ITC Investigation No. 337-744, captioned: "Certain Mobile Devices, Associated Software, and Components Thereof" "Appendix A4_113 Mathisen Novelis DOS 7 1994".
ITC Investigation No. 337-744, captioned: "Certain Mobile Devices, Associated Software, and Components Thereof" "Appendix A4_114 Matthias 25 Years of DOS 2000".
ITC Investigation No. 337-744, captioned: "Certain Mobile Devices, Associated Software, and Components Thereof" "Appendix A4_115 McCormick Present Mgr 1990".
ITC Investigation No. 337-744, captioned: "Certain Mobile Devices, Associated Software, and Components Thereof" "Appendix A4_116 Mefford Adding Notes 1987".
ITC Investigation No. 337-744, captioned: "Certain Mobile Devices, Associated Software, and Components Thereof" "Appendix A4_117 Merkmal Ansp 1 Ex 5 of Ref"—Filed Oct. 4, 2010.
ITC Investigation No. 337-744, captioned: "Certain Mobile Devices, Associated Software, and Components Thereof" "Appendix A4_118 Merkmal Ansp 12 Ex 6 of Ref"—Filed Oct. 4, 2010.
ITC Investigation No. 337-744, captioned: "Certain Mobile Devices, Associated Software, and Components Thereof" "Appendix A4_119 Microsoft App C—LAN Mgr Macintosh"—Filed Oct. 4, 2010.
ITC Investigation No. 337-744, captioned: "Certain Mobile Devices, Associated Software, and Components Thereof" "Appendix A4_121 Microsoft Common Name Ex15 1994".
ITC Investigation No. 337-744, captioned: "Certain Mobile Devices, Associated Software, and Components Thereof" "Appendix A4_122 Microsoft File sharing Protocol 1988".
ITC Investigation No. 337-744, captioned: "Certain Mobile Devices, Associated Software, and Components Thereof" "Appendix A4_124 Neuhaus Databases 1990".
ITC Investigation No. 337-744, captioned: "Certain Mobile Devices, Associated Software, and Components Thereof" "Appendix A4_125 Newsgroups Ex. 7a of Ref 1992".
ITC Investigation No. 337-744, captioned: "Certain Mobile Devices, Associated Software, and Components Thereof" "Appendix A4_126 Newsgroups Ex. 7b of Ref 1991".
ITC Investigation No. 337-744, captioned: "Certain Mobile Devices, Associated Software, and Components Thereof" "Appendix A4_127 Newsgroups Ex. 7c of Ref 1991".
ITC Investigation No. 337-744, captioned: "Certain Mobile Devices, Associated Software, and Components Thereof" "Appendix A4_128 Newsgroups Ex. 7d of Ref 1992".
ITC Investigation No. 337-744, captioned: "Certain Mobile Devices, Associated Software, and Components Thereof" "Appendix A4_129 Nilsson Sherlock Solves 1993".
ITC Investigation No. 337-744, captioned: "Certain Mobile Devices, Associated Software, and Components Thereof" "Appendix A Index—CD 5 of 5"—Filed Oct. 4, 2010.
ITC Investigation No. 337-744, captioned: "Certain Mobile Devices, Associated Software, and Components Thereof" "Appendix A5_130 Olson Student Writes Free DOS 1994".
ITC Investigation No. 337-744, captioned: "Certain Mobile Devices, Associated Software, and Components Thereof" "Appendix A5_131 OMalley Fetch Desk 1993".
ITC Investigation No. 337-744, captioned: "Certain Mobile Devices, Associated Software, and Components Thereof" "Appendix A5_132 PC Guide File Allocation Tables 2001".
ITC Investigation No. 337-744, captioned: "Certain Mobile Devices, Associated Software, and Components Thereof" "Appendix A5_133 Petzold 1989 the Year in Oper Sys 1990".
ITC Investigation No. 337-744, captioned: "Certain Mobile Devices, Associated Software, and Components Thereof" "Appendix A5_134 Petzold OS-2 a New Beg 1988".
ITC Investigation No. 337-744, captioned: "Certain Mobile Devices, Associated Software, and Components Thereof" "Appendix A5_135 Prosise Retrofitting 1986".
ITC Investigation No. 337-744, captioned: "Certain Mobile Devices, Associated Software, and Components Thereof" "Appendix A5_136 Prosise Tutor 1992".
ITC Investigation No. 337-744, captioned: "Certain Mobile Devices, Associated Software, and Components Thereof" "Appendix A5_137 Proteo Master Their PCs 1991".
ITC Investigation No. 337-744, captioned: "Certain Mobile Devices, Associated Software, and Components Thereof" "Appendix A5_138 Response to Office Comm 2000".
ITC Investigation No. 337-744, captioned: "Certain Mobile Devices, Associated Software, and Components Thereof" "Appendix A5_139 Rettig Custom Windowsw 1993".
ITC Investigation No. 337-744, captioned: "Certain Mobile Devices, Associated Software, and Components Thereof" "Appendix A5_140 Rizzo Disks of Diff Color 1991".
ITC Investigation No. 337-744, captioned: "Certain Mobile Devices, Associated Software, and Components Thereof" "Appendix A5_141 Rock Ridge Prot Vers 1.09 1991".
ITC Investigation No. 337-744, captioned: "Certain Mobile Devices, Associated Software, and Components Thereof" "Appendix A5_142 Rohan Golden Retriever 1992".

(56) References Cited

OTHER PUBLICATIONS

ITC Investigation No. 337-744, captioned: "Certain Mobile Devices, Associated Software, and Components Thereof" "Appendix A5_143 Ruley Feature-Rich Beta 1992".
ITC Investigation No. 337-744, captioned: "Certain Mobile Devices, Associated Software, and Components Thereof" "Appendix A5_144 Saiedian Frame for Assessment 1996".
ITC Investigation No. 337-744, captioned: "Certain Mobile Devices, Associated Software, and Components Thereof" "Appendix A5_145 Sanders the RO 1987".
ITC Investigation No. 337-744, captioned: "Certain Mobile Devices, Associated Software, and Components Thereof" "Appendix A5_146 Simon What You Can Do 1991".
ITC Investigation No. 337-744, captioned: "Certain Mobile Devices, Associated Software, and Components Thereof" "Appendix A5_147 Smith OS-2.2.0 Does the Job 1992".
ITC Investigation No. 337-744, captioned: "Certain Mobile Devices, Associated Software, and Components Thereof" "Appendix A5_148 Sobell Practice Guide Unix 1989".
ITC Investigation No. 337-744, captioned: "Certain Mobile Devices, Associated Software, and Components Thereof" "Appendix A5_149 Somerson DOS 5.0 1991".
ITC Investigation No. 337-744, captioned: "Certain Mobile Devices, Associated Software, and Components Thereof" "Appendix A5_150 Somerson Spy-Proof 1992".
ITC Investigation No. 337-744, captioned: "Certain Mobile Devices, Associated Software, and Components Thereof" "Appendix A5_151 Slyer Disks 1997".
ITC Investigation No. 337-744, captioned: "Certain Mobile Devices, Associated Software, and Components Thereof" "Appendix A5_152 Tanenbaum Modern OS 2001".
ITC Investigation No. 337-744, captioned: "Certain Mobile Devices, Associated Software, and Components Thereof" "Appendix A5_153 Trivette Utility 60 Char 1988".
ITC Investigation No. 337-744, captioned: "Certain Mobile Devices, Associated Software, and Components Thereof" "Appendix A5_154 vinDaci Long Filename Spec 1998".
ITC Investigation No. 337-744, captioned: "Certain Mobile Devices, Associated Software, and Components Thereof" "Appendix A5_155 Wagner Developers Tour of Chicago 1993".
ITC Investigation No. 337-744, captioned: "Certain Mobile Devices, Associated Software, and Components Thereof""Appendix A5_156 Wang Universal File 1990".
ITC Investigation No. 337-744, captioned: "Certain Mobile Devices, Associated Software, and Components Thereof" "Appendix A5_157 Wendin Wendin DOS 1987".
ITC Investigation No. 337-744, captioned: "Certain Mobile Devices, Associated Software, and Components Thereof" "Appendix A5_158 Wikipedia Comparison of FS 2005".
ITC Investigation No. 337-744, captioned: "Certain Mobile Devices, Associated Software, and Components Thereof" "Appendix A5_159 Wikipedia DOS 2005".
ITC Investigation No. 337-744, captioned: "Certain Mobile Devices, Associated Software, and Components Thereof" "Appendix A5_161 Windows Mag Access Review 1993".
ITC Investigation No. 337-744, captioned: "Certain Mobile Devices, Associated Software, and Components Thereof" "Appendix A5_162 Winship DOS Shells 1990".
ITC Investigation No. 337-744, captioned: "Certain Mobile Devices, Associated Software, and Components Thereof" "Appendix A5_163 WSC Extend-A-Name 1988".
ITC Investigation No. 337-744, captioned: "Certain Mobile Devices, Associated Software, and Components Thereof" "Appendix A5_164 Young CD-ROM Stand 1991".
ITC Investigation No. 337-744, captioned: "Certain Mobile Devices, Associated Software, and Components Thereof" "Appendix A5_165 Zelnick Way You Work 1991".
ITC Investigation No. 337-744, captioned: "Certain Mobile Devices, Associated Software, and Components Thereof" "Complaint"—Filed Oct. 1, 2010.
ITC Investigation No. 337-744, captioned: "Certain Mobile Devices, Associated Software, and Components Thereof" "Publ Version of Conf Exhibits (9 thru 48)"—Filed Oct. 1, 2010.
ITC Investigation No. 337-744, captioned: "Certain Mobile Devices, Associated Software, and Components Thereof" "Exhibit 1"—Filed Oct. 1, 2010.
ITC Investigation No. 337-744, captioned: "Certain Mobile Devices, Associated Software, and Components Thereof" "Exhibit 2"—Filed Oct. 1, 2010.
ITC Investigation No. 337-744, captioned: "Certain Mobile Devices, Associated Software, and Components Thereof" "Exhibit 3"—Filed Oct. 1, 2010.
ITC Investigation No. 337-744, captioned: "Certain Mobile Devices, Associated Software, and Components Thereof" "Exhibit 4"—Filed Oct. 1, 2010.
ITC Investigation No. 337-744, captioned: "Certain Mobile Devices, Associated Software, and Components Thereof" "Exhibit 5"—Filed Oct. 1, 2010.
ITC Investigation No. 337-744, captioned: "Certain Mobile Devices, Associated Software, and Components Thereof" "Exhibit 6"—Filed Oct. 1, 2010.
ITC Investigation No. 337-744, captioned: "Certain Mobile Devices, Associated Software, and Components Thereof" Doc. No. "Exhibit 7"—Filed Oct. 1, 2010.
ITC Investigation No. 337-744, captioned: "Certain Mobile Devices, Associated Software, and Components Thereof" "Exhibit 8"—Filed Oct. 1, 2010.
ITC Investigation No. 337-744, captioned: "Certain Mobile Devices, Associated Software, and Components Thereof" "Exhibit 11"—Filed Oct. 1, 2010.
ITC Investigation No. 337-744, captioned: "Certain Mobile Devices, Associated Software, and Components Thereof" "Exhibit 12"—Filed Oct. 1, 2010.
ITC Investigation No. 337-744, captioned: "Certain Mobile Devices, Associated Software, and Components Thereof" "Exhibit 13"—Filed Oct. 1, 2010.
ITC Investigation No. 337-744, captioned: "Certain Mobile Devices, Associated Software, and Components Thereof" "Exhibit 15"—Filed Oct. 1, 2010.
ITC Investigation No. 337-744, captioned: "Certain Mobile Devices, Associated Software, and Components Thereof" "Exhibit 16"—Filed Oct. 1, 2010.
ITC Investigation No. 337-744, captioned: "Certain Mobile Devices, Associated Software, and Components Thereof" "Exhibit 17"—Filed Oct. 1, 2010.
ITC Investigation No. 337-744, captioned: "Certain Mobile Devices, Associated Software, and Components Thereof" "Exhibit 19"—Filed Oct. 1, 2010.
ITC Investigation No. 337-744, captioned: "Certain Mobile Devices, Associated Software, and Components Thereof" "Exhibit 20"—Filed Oct. 1, 2010.
ITC Investigation No. 337-744, captioned: "Certain Mobile Devices, Associated Software, and Components Thereof" "Exhibit 21"—Filed Oct. 1, 2010.
ITC Investigation No. 337-744, captioned: "Certain Mobile Devices, Associated Software, and Components Thereof" "Exhibit 23"—Filed Oct. 1, 2010.
ITC Investigation No. 337-744, captioned: "Certain Mobile Devices, Associated Software, and Components Thereof" "Exhibit 24"—Filed Oct. 1, 2010.
ITC Investigation No. 337-744, captioned: "Certain Mobile Devices, Associated Software, and Components Thereof" "Exhibit 25"—Filed Oct. 1, 2010.
ITC Investigation No. 337-744, captioned: "Certain Mobile Devices, Associated Software, and Components Thereof" "Exhibit 27"—Filed Oct. 1, 2010.
ITC Investigation No. 337-744, captioned: "Certain Mobile Devices, Associated Software, and Components Thereof" "Exhibit 28"—Filed Oct. 1, 2010.
ITC Investigation No. 337-744, captioned: "Certain Mobile Devices, Associated Software, and Components Thereof" "Exhibit 29"—Filed Oct. 1, 2010.

(56) References Cited

OTHER PUBLICATIONS

ITC Investigation No. 337-744, captioned: "Certain Mobile Devices, Associated Software, and Components Thereof" "Exhibit 31"—Filed Oct. 1, 2010.
ITC Investigation No. 337-744, captioned: "Certain Mobile Devices, Associated Software, and Components Thereof" "Exhibit 32"—Filed Oct. 1, 2010.
ITC Investigation No. 337-744, captioned: "Certain Mobile Devices, Associated Software, and Components Thereof" "Exhibit 33"—Filed Oct. 1, 2010.
ITC Investigation No. 337-744, captioned: "Certain Mobile Devices, Associated Software, and Components Thereof" "Exhibit 35"—Filed Oct. 1, 2010.
ITC Investigation No. 337-744, captioned: "Certain Mobile Devices, Associated Software, and Components Thereof" "Exhibit 36"—Filed Oct. 1, 2010.
ITC Investigation No. 337-744, captioned: "Certain Mobile Devices, Associated Software, and Components Thereof" "Exhibit 37"—Filed Oct. 1, 2010.
ITC Investigation No. 337-744, captioned: "Certain Mobile Devices, Associated Software, and Components Thereof" "Exhibit 39"—Filed Oct. 1, 2010.
ITC Investigation No. 337-744, captioned: "Certain Mobile Devices, Associated Software, and Components Thereof" "Exhibit 40"—Filed Oct. 1, 2010.
ITC Investigation No. 337-744, captioned: "Certain Mobile Devices, Associated Software, and Components Thereof" "Exhibit 41"—Filed Oct. 1, 2010.
ITC Investigation No. 337-744, captioned: "Certain Mobile Devices, Associated Software, and Components Thereof" "Exhibit 42"—Filed Oct. 1, 2010.
ITC Investigation No. 337-744, captioned: "Certain Mobile Devices, Associated Software, and Components Thereof" "Exhibit 43"—Filed Oct. 1, 2010.
ITC Investigation No. 337-744, captioned: "Certain Mobile Devices, Associated Software, and Components Thereof" "Exhibit 44"—Filed Oct. 1, 2010.
ITC Investigation No. 337-744, captioned: "Certain Mobile Devices, Associated Software, and Components Thereof" "Exhibit 45"—Filed Oct. 1, 2010.
ITC Investigation No. 337-744, captioned: "Certain Mobile Devices, Associated Software, and Components Thereof" "Exhibit 46 pt 1"—Filed Oct. 1, 2010.
ITC Investigation No. 337-744, captioned: "Certain Mobile Devices, Associated Software, and Components Thereof" "Exhibit 46 pt 2"—Filed Oct. 1, 2010.
ITC Investigation No. 337-744, captioned: "Certain Mobile Devices, Associated Software, and Components Thereof" "Exhibit 47"—Filed Oct. 1, 2010.
ITC Investigation No. 337-744, captioned: "Certain Mobile Devices, Associated Software, and Components Thereof" "Exhibit 49"—Filed Oct. 1, 2010.
ITC Investigation No. 337-744, captioned: "Certain Mobile Devices, Associated Software, and Components Thereof" "Exhibit 50"—Filed Oct. 1, 2010.
ITC Investigation No. 337-744, captioned: "Certain Mobile Devices, Associated Software, and Components Thereof" "Exhibit 51"—Filed Oct. 1, 2010.
ITC Investigation No. 337-744, captioned: "Certain Mobile Devices, Associated Software, and Components Thereof" "Exhibit 52"—Filed Oct. 1, 2010.
ITC Investigation No. 337-744, captioned: "Certain Mobile Devices, Associated Software, and Components Thereof" "Exhibit 53"—Filed Oct. 1, 2010.
ITC Investigation No. 337-744, captioned: "Certain Mobile Devices, Associated Software, and Components Thereof" "Exhibit 54"—Filed Oct. 1, 2010.
ITC Investigation No. 337-744, captioned: "Certain Mobile Devices, Associated Software, and Components Thereof" "Exhibit 55"—Filed Oct. 1, 2010.
ITC Investigation No. 337-744, captioned: "Certain Mobile Devices, Associated Software, and Components Thereof" "Exhibit 56"—Filed Oct. 1, 2010.
ITC Investigation No. 337-744, captioned: "Certain Mobile Devices, Associated Software, and Components Thereof" "Exhibit 57"—Filed Oct. 1, 2010.
ITC Investigation No. 337-744, captioned: "Certain Mobile Devices, Associated Software, and Components Thereof" "Exhibit 58"—Filed Oct. 1, 2010.
ITC Investigation No. 337-744, captioned: "Certain Mobile Devices, Associated Software, and Components Thereof" "Exhibit 59"—Filed Oct. 1, 2010.
ITC Investigation No. 337-744, captioned: "Certain Mobile Devices, Associated Software, and Components Thereof" "First Amended Verified Complaint"—Filed Oct. 12, 2010.
ITC Investigation No. 337-744, captioned: "Certain Mobile Devices, Associated Software, and Components Thereof" "Respondents Motorola Response to the Amended Complaint"—Filed Nov. 22, 2010.
ITC Investigation No. 337-744, captioned: "Certain Mobile Devices, Associated Software, and Components Thereof" "Original Verification to Motorola's Response to Amended Complaint"—Filed Nov. 23, 2010.
ITC Investigation No. 337-744, captioned: "Certain Mobile Devices, Associated Software, and Components Thereof" "Discovery Statement of the Commission Investigative Staff"—Filed Nov. 29, 2010.
ITC Investigation No. 337-744, captioned: "Certain Mobile Devices, Associated Software, and Components Thereof" "Microsoft's Opening Claim Construction Brief"—Filed Feb. 24, 2010.
ITC Investigation No. 337-744, captioned: "Certain Mobile Devices, Associated Software, and Components Thereof" "Exhibit List"—Filed Feb. 24, 2011.
ITC Investigation No. 337-744, captioned: "Certain Mobile Devices, Associated Software, and Components Thereof" "Exhibit 101"—Filed Feb. 24, 2011.
ITC Investigation No. 337-744, captioned: "Certain Mobile Devices, Associated Software, and Components Thereof" "Exhibit 102"—Filed Feb. 24, 2011.
ITC Investigation No. 337-744, captioned: "Certain Mobile Devices, Associated Software, and Components Thereof" "Exhibit 103"—Filed Feb. 24, 2011.
ITC Investigation No. 337-744, captioned: "Certain Mobile Devices, Associated Software, and Components Thereof" "Exhibit 104"—Filed Feb. 24, 2011.
ITC Investigation No. 337-744, captioned: "Certain Mobile Devices, Associated Software, and Components Thereof" "Exhibit 201"—Filed Feb. 24, 2011.
ITC Investigation No. 337-744, captioned: "Certain Mobile Devices, Associated Software, and Components Thereof" "Exhibit 301"—Filed Feb. 24, 2011.
ITC Investigation No. 337-744, captioned: "Certain Mobile Devices, Associated Software, and Components Thereof" "Exhibit 302"—Filed Feb. 24, 2011.
ITC Investigation No. 337-744, captioned: "Certain Mobile Devices, Associated Software, and Components Thereof" "Exhibit 303"—Filed Feb. 24, 2011.
ITC Investigation No. 337-744, captioned: "Certain Mobile Devices, Associated Software, and Components Thereof" "Exhibit 401"—Filed Feb. 24, 2011.
ITC Investigation No. 337-744, captioned: "Certain Mobile Devices, Associated Software, and Components Thereof" "Exhibit 402 pt1"—Filed Feb. 24, 2011.
ITC Investigation No. 337-744, captioned: "Certain Mobile Devices, Associated Software, and Components Thereof" "Exhibit 402 pt2"—Filed Feb. 24, 2011.
ITC Investigation No. 337-744, captioned: "Certain Mobile Devices, Associated Software, and Components Thereof" "Exhibit 501"—Filed Feb. 24, 2011.
ITC Investigation No. 337-744, captioned: "Certain Mobile Devices, Associated Software, and Components Thereof" "Exhibit 502"—Filed Feb. 24, 2011.

(56) References Cited

OTHER PUBLICATIONS

ITC Investigation No. 337-744, captioned: "Certain Mobile Devices, Associated Software, and Components Thereof" "Exhibit 503"—Filed Feb. 24, 2011.
ITC Investigation No. 337-744, captioned: "Certain Mobile Devices, Associated Software, and Components Thereof" "Exhibit 504"—Filed Feb. 24, 2011.
ITC Investigation No. 337-744, captioned: "Certain Mobile Devices, Associated Software, and Components Thereof" "Exhibit 505"—Filed Feb. 24, 2011.
ITC Investigation No. 337-744, captioned: "Certain Mobile Devices, Associated Software, and Components Thereof" "Exhibit 601"—Filed Feb. 24, 2011.
ITC Investigation No. 337-744, captioned: "Certain Mobile Devices, Associated Software, and Components Thereof" "Exhibit 602"—Filed Feb. 24, 2011.
ITC Investigation No. 337-744, captioned: "Certain Mobile Devices, Associated Software, and Components Thereof" "Exhibit 701"—Filed Feb. 24, 2011.
ITC Investigation No. 337-744, captioned: "Certain Mobile Devices, Associated Software, and Components Thereof" "Exhibit 702 pt1"—Filed Feb. 24, 2011.
ITC Investigation No. 337-744, captioned: "Certain Mobile Devices, Associated Software, and Components Thereof" "Exhibit 702 pt2"—Filed Feb. 24, 2011.
ITC Investigation No. 337-744, captioned: "Certain Mobile Devices, Associated Software, and Components Thereof" "Exhibit 703"—Filed Feb. 24, 2011.
ITC Investigation No. 337-744, captioned: "Certain Mobile Devices, Associated Software, and Components Thereof" "Exhibit 801"—Filed Feb. 24, 2011.
ITC Investigation No. 337-744, captioned: "Certain Mobile Devices, Associated Software, and Components Thereof" "Exhibit 802 pt2"—Filed Feb. 24, 2011.
ITC Investigation No. 337-744, captioned: "Certain Mobile Devices, Associated Software, and Components Thereof" "Exhibit 802"—Filed Feb. 24, 2011.
ITC Investigation No. 337-744, captioned: "Certain Mobile Devices, Associated Software, and Components Thereof" "Exhibit 803"—Filed Feb. 24, 2011.
ITC Investigation No. 337-744, captioned: "Certain Mobile Devices, Associated Software, and Components Thereof" "Public Exhibit 804"—Filed Feb. 24, 2011.
ITC Investigation No. 337-744, captioned: "Certain Mobile Devices, Associated Software, and Components Thereof" "Exhibit 901"—Filed Feb. 24, 2011.
ITC Investigation No. 337-744, captioned: "Certain Mobile Devices, Associated Software, and Components Thereof" "Exhibit 902—Part 1"—Filed Feb. 24, 2011.
ITC Investigation No. 337-744, captioned: "Certain Mobile Devices, Associated Software, and Components Thereof" "Exhibit 902 Prt2"—Filed Feb. 24, 2011.
ITC Investigation No. 337-744, captioned: "Certain Mobile Devices, Associated Software, and Components Thereof" "Exhibit 902 pt3"—Filed Feb. 24, 2011.
ITC Investigation No. 337-744, captioned: "Certain Mobile Devices, Associated Software, and Components Thereof" "Exhibit 903"—Filed Feb. 24, 2011.
ITC Investigation No. 337-744, captioned: "Certain Mobile Devices, Associated Software, and Components Thereof"—Filed Feb. 25, 2011.
ITC Investigation No. 337-744, captioned: "Certain Mobile Devices, Associated Software, and Components Thereof"—Filed Feb. 25, 2011.
ITC Investigation No. 337-744, captioned: "Certain Mobile Devices, Associated Software, and Components Thereof"—Filed Mar. 25, 2011.
ITC Investigation No. 337-744, captioned: "Certain Mobile Devices, Associated Software, and Components Thereof"—Filed May 25, 2011.

ITC Investigation No. 337-744, captioned: "Certain Mobile Devices, Associated Software, and Components Thereof" "Appendix C Index"—Filed Oct. 4, 2010.
ITC Investigation No. 337-744, captioned: "Certain Mobile Devices, Associated Software, and Components Thereof" "Appendix C1"—Filed Oct. 4, 2010.
ITC Investigation No. 337-744, captioned: "Certain Mobile Devices, Associated Software, and Components Thereof" "Appendix C2_Tech Refs Cited in 6621746"—Filed Oct. 4, 2010.
ITC Investigation No. 337-744, captioned: "Certain Mobile Devices, Associated Software, and Components Thereof" "Appendix D Index-CD 1 of 1"—Filed Oct. 4, 2010.
ITC Investigation No. 337-744, captioned: "Certain Mobile Devices, Associated Software, and Components Thereof" "Appendix D"—Filed Oct. 4, 2010
ITC Investigation No. 337-744, captioned: "Certain Mobile Devices, Associated Software, and Components Thereof" "Appendix D1_part 1"—Filed Oct. 4, 2010.
ITC Investigation No. 337-744, captioned: "Certain Mobile Devices, Associated Software, and Components Thereof" "Appendix D1_part 2"—Filed Oct. 4, 2010.
ITC Investigation No. 337-744, captioned: "Certain Mobile Devices, Associated Software, and Components Thereof" "Appendix D2_000 Tech Refs Cited in 6826762"—Filed Oct. 4, 2010.
ITC Investigation No. 337-744, captioned: "Certain Mobile Devices, Associated Software, and Components Thereof" "Appendix D2_009 Cappelletti Mobile Computing Beyond Laptops 1997".
ITC Investigation No. 337-744, captioned: "Certain Mobile Devices, Associated Software, and Components Thereof" "Appendix D2_010 Darby Bridging Wireless and Wired Networks 1999".
ITC Investigation No. 337-744, captioned: "Certain Mobile Devices, Associated Software, and Components Thereof" "Appendix D2_011 Davies L2imbo a Distributed Systems Platform 1998".
ITC Investigation No. 337-744, captioned: "Certain Mobile Devices, Associated Software, and Components Thereof" "Appendix D2_012 Kristoffersen Making Place to Make It Work 1999".
ITC Investigation No. 337-744, captioned: "Certain Mobile Devices, Associated Software, and Components Thereof" "Appendix D2_013 Mattila Design Designing Mobile Phones 1999".
ITC Investigation No. 337-744, captioned: "Certain Mobile Devices, Associated Software, and Components Thereof" "Appendix D2_014 Steeman Wireless Application Protocol (WAP) 2000".
ITC Investigation No. 337-744, captioned: "Certain Mobile Devices, Associated Software, and Components Thereof" "Appendix D2_015 Tso Always on Always Connected 1996".
ITC Investigation No. 337-744, captioned: "Certain Mobile Devices, Associated Software, and Components Thereof" "Appendix E Index-CD 1 of 1"—Filed Oct. 4, 2010.
ITC Investigation No. 337-744, captioned: "Certain Mobile Devices, Associated Software, and Components Thereof" "Appendix E"—Filed Oct. 4, 2010.
ITC Investigation No. 337-744, captioned: "Certain Mobile Devices, Associated Software, and Components Thereof" "Appendix E1 6909910_Certified FH"—Filed Oct. 4, 2010.
ITC Investigation No. 337-744, captioned: "Certain Mobile Devices, Associated Software, and Components Thereof" "Appendix E2_000 Tech Refs Cited in 6909910"—Filed Oct. 4, 2010.
ITC Investigation No. 337-744, captioned: "Certain Mobile Devices, Associated Software, and Components Thereof" "Appendix F Index-CD 1 of 1"—Filed Oct. 4, 2010.
ITC Investigation No. 337-744, captioned: "Certain Mobile Devices, Associated Software, and Components Thereof" "Appendix F"—Filed Oct. 4, 2010.
ITC Investigation No. 337-744, captioned: "Certain Mobile Devices, Associated Software, and Components Thereof" "Appendix F1 7644376_Certified FH"—Filed Oct. 4, 2010.
ITC Investigation No. 337-744, captioned: "Certain Mobile Devices, Associated Software, and Components Thereof" "Appendix F2_000.Tech Refs Cited in 7644376"—Filed Oct. 4, 2010.
ITC Investigation No. 337-744, captioned: "Certain Mobile Devices, Associated Software, and Components Thereof" "Appendix F2_008.Inouye Dyami . . . rk Reconfiguration (2007)".

(56) References Cited

OTHER PUBLICATIONS

ITC Investigation No. 337-744, captioned: "Certain Mobile Devices, Associated Software, and Components Thereof" "Appendix F2_009 U.S. Appl. No. 60/513,723"—Filed Oct. 4, 2010.

ITC Investigation No. 337-744, captioned: "Certain Mobile Devices, Associated Software, and Components Thereof" "Appendix G Index-CD 1 of 1"—Filed Oct. 4, 2010.

ITC Investigation No. 337-744, captioned: "Certain Mobile Devices, Associated Software, and Components Thereof" "Appendix G2_000 Tech Refs Cited in 5664133"—Filed Oct. 4, 2010.

ITC Investigation No. 337-744, captioned: "Certain Mobile Devices, Associated Software, and Components Thereof" "Appendix I Index-CD 1 of 1"—Filed Oct. 4, 2010.

ITC Investigation No. 337-744, captioned: "Certain Mobile Devices, Associated Software, and Components Thereof" "Appendix I2_000. Tech Refs Cited in 6370566"—Filed Oct. 4, 2010.

ITC Investigation No. 337-744, captioned: "Certain Mobile Devices, Associated Software, and Components Thereof" "Appendix I2_034. Byrne_The MS Outlook 97 Automation Model"—Filed Oct. 4, 2010.

ITC Investigation No. 337-744, captioned: "Certain Mobile Devices, Associated Software, and Components Thereof" "Appendix I2_Tech Discl Method for PDA Calendar"—Filed Oct. 4, 2010.

ITC Investigation No. 337-744, captioned: "Certain Mobile Devices, Associated Software, and Components Thereof" "Appendix I2_036. MS Apptitem Object"—Filed Oct. 4, 2010.

ITC Investigation No. 337-744, captioned: "Certain Mobile Devices, Associated Software, and Components Thereof" "Appendix I2_037. MS RecurrencePattern Object"—Filed Oct. 4, 2010.

ITC Investigation No. 337-744, captioned: "Certain Mobile Devices, Associated Software, and Components Thereof" "Appendix I2_038. MS RecurringEvent Object"—Filed Oct. 4, 2010.

ITC Investigation No. 337-744, captioned: "Certain Mobile Devices, Associated Software, and Components Thereof" "Appendix I2_039. MSOffice 97 Guide_Chp 5 MS Outlook Objects"—Filed Oct. 4, 2010.

ITC Investigation No. 337-744, captioned: "Certain Mobile Devices, Associated Software, and Components Thereof" "Appendix I2_040. OConnor_Managing Contacts in Windows 95"—Filed Oct. 4, 2010.

ITC Investigation No. 337-744, captioned: "Certain Mobile Devices, Associated Software, and Components Thereof" "Appendix I2_041. Pepper_The CallManager System"—Filed Oct. 4, 2010.

ITC Investigation No. 337-744, captioned: "Certain Mobile Devices, Associated Software, and Components Thereof" "Appendix H Index-CD 1 of 1"—Filed Oct. 4, 2010.

ITC Investigation No. 337-744, captioned: "Certain Mobile Devices, Associated Software, and Components Thereof" "Appendix H1_Part 2"—Filed Oct. 4, 2010.

ITC Investigation No. 337-744, captioned: "Certain Mobile Devices, Associated Software, and Components Thereof" "Appendix H2_000.Tech Refs Cited in 6578054"—Filed Oct. 4, 2010.

ITC Investigation No. 337-744, captioned: "Certain Mobile Devices, Associated Software, and Components Thereof" "Appendix H2_013.Borenstein MIME Part One_1993"—Filed Oct. 4, 2010.

ITC Investigation No. 337-744, captioned: "Certain Mobile Devices, Associated Software, and Components Thereof" "Appendix H2_014.Fielding Hypertext Trnsfer Protocol"—Filed Oct. 4, 2010.

ITC Investigation No. 337-744, captioned: "Certain Mobile Devices, Associated Software, and Components Thereof" "Appendix H2_015.Fielding Hypertext Transfr Protocol"—Filed Oct. 4, 2010.

ITC Investigation No. 337-744, captioned: "Certain Mobile Devices, Associated Software, and Components Thereof" "Appendix H2_016.Goland HTTP Exts for Distrib Authoring"—Filed Oct. 4, 2010.

ITC Investigation No. 337-744, captioned: "Certain Mobile Devices, Associated Software, and Components Thereof" "Appendix H2_017.Martin Strategy for Distrib DP"—Filed Oct. 4, 2010.

ITC Investigation No. 337-744, captioned: "Certain Mobile Devices, Associated Software, and Components Thereof" "Appendix H2_018.Slein Reqmnts for a Dist Authoring"—Filed Oct. 4, 2010.

ITC Investigation No. 337-744, captioned: "Certain Mobile Devices, Associated Software, and Components Thereof" "Appendix H2_019.Yavin Republication Fact Track"—Filed Oct. 4, 2010.

ITC Investigation No. 337-744, captioned: "Certain Mobile Devices, Associated Software, and Components Thereof" "Microsoft's Reply Claim Construction Brief"—Filed Mar. 3, 2011.

ITC Investigation No. 337-744, captioned: "Certain Mobile Devices, Associated Software, and Components Thereof" "Exhibit 105"—Filed Mar. 3, 2011.

ITC Investigation No. 337-744, captioned: "Certain Mobile Devices, Associated Software, and Components Thereof" "Exhibit 106"—Filed Mar. 3, 2011.

ITC Investigation No. 337-744, captioned: "Certain Mobile Devices, Associated Software, and Components Thereof" "Exhibit 304"—Filed Mar. 3, 2011.

ITC Investigation No. 337-744, captioned: "Certain Mobile Devices, Associated Software, and Components Thereof" "Exhibit 305"—Filed Mar. 3, 2011.

ITC Investigation No. 337-744, captioned: "Certain Mobile Devices, Associated Software, and Components Thereof" "Exhibit 306"—Filed Mar. 3, 2011.

ITC Investigation No. 337-744, captioned: "Certain Mobile Devices, Associated Software, and Components Thereof" "Exhibit 704"—Filed Mar. 3, 2011.

ITC Investigation No. 337-744, captioned: "Certain Mobile Devices, Associated Software, and Components Thereof" "Exhibit 705"—Filed Mar. 3, 2011.

ITC Investigation No. 337-744, captioned: "Certain Mobile Devices, Associated Software, and Components Thereof" "Exhibit List"—Filed Mar. 3, 2011.

ITC Investigation No. 337-744, captioned: "Certain Mobile Devices, Associated Software, and Components Thereof" —Filed Mar. 3, 2011.

ITC Investigation No. 337-744, captioned: "Certain Mobile Devices, Associated Software, and Components Thereof"—Filed Mar. 3, 2011.

ITC Investigation No. 337-744, captioned: "Certain Mobile Devices, Associated Software, and Components Thereof" "Respondents Motorola, Inc. and Motorola Mobility Inc. and Complainant Microsoft Corporation's Joint Claim Chart"—Filed Mar. 3, 2011.

ITC Investigation No. 337-744, captioned: "Certain Mobile Devices, Associated Software, and Components Thereof"—Filed 03/21/11.

ITC Investigation No. 337-744, captioned: "Certain Mobile Devices, Associated Software, and Components Thereof" —Filed Apr. 27, 2011.

ITC Investigation No. 337-744, captioned: "Certain Mobile Devices, Associated Software, and Components Thereof" "A1 Photocopy of CD of 5579517"—Filed Oct. 4, 2010.

ITC Investigation No. 337-744, captioned: "Certain Mobile Devices, Associated Software, and Components Thereof" "A2 Photocopy of CD 90-007007_Reexam 517"—Filed Oct. 4, 2010.

ITC Investigation No. 337-744, captioned: "Certain Mobile Devices, Associated Software, and Components Thereof" "A3 Photocopy of CD 90-007371_Reexam 517"—Filed Oct. 4, 2010.

ITC Investigation No. 337-744, captioned: "Certain Mobile Devices, Associated Software, and Components Thereof" "Appendix A Index—CD 1 of 5"—Filed Oct. 4, 2010.

ITC Investigation No. 337-744, captioned: "Certain Mobile Devices, Associated Software, and Components Thereof" "Appendix A1_Part 1"—Filed Oct. 4, 2010.

ITC Investigation No. 337-744, captioned: "Certain Mobile Devices, Associated Software, and Components Thereof" "Appendix A1_Part 2"—Filed Oct. 4, 2010.

ITC Investigation No. 337-744, captioned: "Certain Mobile Devices, Associated Software, and Components Thereof" "Appendix A1_Part 3"—Filed Oct. 4, 2010.

ITC Investigation No. 337-744, captioned: "Certain Mobile Devices, Associated Software, and Components Thereof" "Appendix A1_Part 4"—Filed Oct. 4, 2010.

ITC Investigation No. 337-744, captioned: "Certain Mobile Devices, Associated Software, and Components Thereof" "Appendix A2_Part 1"—Filed Oct. 4, 2010.

(56) References Cited

OTHER PUBLICATIONS

ITC Investigation No. 337-744, captioned: "Certain Mobile Devices, Associated Software, and Components Thereof" "Appendix A2_Part 10"—Filed Oct. 4, 2010.
ITC Investigation No. 337-744, captioned: "Certain Mobile Devices, Associated Software, and Components Thereof" "Appendix A2_Part 11"—Filed Oct. 4, 2010.
ITC Investigation No. 337-744, captioned: "Certain Mobile Devices, Associated Software, and Components Thereof" "Appendix A2_Part 12"—Filed Oct. 4, 2010.
ITC Investigation No. 337-744, captioned: "Certain Mobile Devices, Associated Software, and Components Thereof" "Appendix A2_Part 13"—Filed Oct. 4, 2010.
ITC Investigation No. 337-744, captioned: "Certain Mobile Devices, Associated Software, and Components Thereof" "Appendix A2_Part 14"—Filed Oct. 4, 2010.
ITC Investigation No. 337-744, captioned: "Certain Mobile Devices, Associated Software, and Components Thereof" "Appendix A2_Part 15"—Filed Oct. 4, 2010.
ITC Investigation No. 337-744, captioned: "Certain Mobile Devices, Associated Software, and Components Thereof" "Appendix A2_Part 16"—Filed Oct. 4, 2010
ITC Investigation No. 337-744, captioned: "Certain Mobile Devices, Associated Software, and Components Thereof" "Appendix A2_Part 17"—Filed Oct. 4, 2010.
ITC Investigation No. 337-744, captioned: "Certain Mobile Devices, Associated Software, and Components Thereof" "Appendix A2_Part 18"—Filed Oct. 4, 2010.
ITC Investigation No. 337-744, captioned: "Certain Mobile Devices, Associated Software, and Components Thereof" "Appendix A2_Part 2"—Filed Oct. 4, 2010.
ITC Investigation No. 337-744, captioned: "Certain Mobile Devices, Associated Software, and Components Thereof" "Appendix A2_Part 3"—Filed Oct. 4, 2010.
ITC Investigation No. 337-744, captioned: "Certain Mobile Devices, Associated Software, and Components Thereof" "Appendix A2_Part 4"—Filed Oct. 4, 2010.
ITC Investigation No. 337-744, captioned: "Certain Mobile Devices, Associated Software, and Components Thereof" "Appendix A2_Part 5"—Filed Oct. 4, 2010.
ITC Investigation No. 337-744, captioned: "Certain Mobile Devices, Associated Software, and Components Thereof" "Appendix A2_Part 6"—Filed Oct. 4, 2010.
ITC Investigation No. 337-744, captioned: "Certain Mobile Devices, Associated Software, and Components Thereof" "Appendix A2_Part 7"—Filed Oct. 4, 2010.
ITC Investigation No. 337-744, captioned: "Certain Mobile Devices, Associated Software, and Components Thereof" "Appendix A2_Part 8" —Filed Oct. 4, 2010.
ITC Investigation No. 337-744, captioned: "Certain Mobile Devices, Associated Software, and Components Thereof" "Appendix A2_Part 9"—Filed Oct. 4, 2010.
ITC Investigation No. 337-744, captioned: "Certain Mobile Devices, Associated Software, and Components Thereof" "Appendix A3_Part 1"—Filed Oct. 4, 2010.
ITC Investigation No. 337-744, captioned: "Certain Mobile Devices, Associated Software, and Components Thereof" "Appendix A3_Part 10"—Filed Oct. 4, 2010.
ITC Investigation No. 337-744, captioned: "Certain Mobile Devices, Associated Software, and Components Thereof" "Appendix A3_Part 11"—Filed Oct. 4, 2010.
ITC Investigation No. 337-744, captioned: "Certain Mobile Devices, Associated Software, and Components Thereof" "Appendix A3_Part 12"—Filed Oct. 4, 2010.
ITC Investigation No. 337-744, captioned: "Certain Mobile Devices, Associated Software, and Components Thereof" "Appendix A3_Part 13"—Filed Oct. 4, 2010.
ITC Investigation No. 337-744, captioned: "Certain Mobile Devices, Associated Software, and Components Thereof" "Appendix A3_Part 14"—Filed Oct. 4, 2010.
ITC Investigation No. 337-744, captioned: "Certain Mobile Devices, Associated Software, and Components Thereof" "Appendix A3_Part 15"—Filed Oct. 4, 2010.
ITC Investigation No. 337-744, captioned: "Certain Mobile Devices, Associated Software, and Components Thereof" "Appendix A3_Part 16"—Filed Oct. 4, 2010.
ITC Investigation No. 337-744, captioned: "Certain Mobile Devices, Associated Software, and Components Thereof" "Appendix A3_Part 17"—Filed Oct. 4, 2010.
ITC Investigation No. 337-744, captioned: "Certain Mobile Devices, Associated Software, and Components Thereof" "Appendix A3_Part 2"—Filed Oct. 4, 2010.
ITC Investigation No. 337-744, captioned: "Certain Mobile Devices, Associated Software, and Components Thereof" "Appendix A3_Part 3"—Filed Oct. 4, 2010.
ITC Investigation No. 337-744, captioned: "Certain Mobile Devices, Associated Software, and Components Thereof" "Appendix A3_Part 4"—Filed Oct. 4, 2010.
ITC Investigation No. 337-744, captioned: "Certain Mobile Devices, Associated Software, and Components Thereof" "Appendix A3_Part 5"—Filed Oct. 4, 2010.
ITC Investigation No. 337-744, captioned: "Certain Mobile Devices, Associated Software, and Components Thereof" "Appendix A3_Part 6"—Filed Oct. 4, 2010.
ITC Investigation No. 337-744, captioned: "Certain Mobile Devices, Associated Software, and Components Thereof" "Appendix A3_Part 7"—Filed Oct. 4, 2010.
ITC Investigation No. 337-744, captioned: "Certain Mobile Devices, Associated Software, and Components Thereof" "Appendix A3_Part 8"—Filed Oct. 4, 2010.
ITC Investigation No. 337-744, captioned: "Certain Mobile Devices, Associated Software, and Components Thereof" "Appendix A3_Part 9"—Filed Oct. 4, 2010.
ITC Investigation No. 337-744, captioned: "Certain Mobile Devices, Associated Software, and Components Thereof" "Appendix A4_Tech Refs Cited in 5579517"—Filed Oct. 4, 2010.
Office Action mailed Jun. 16, 2011, in U.S. Appl. No. 11/115,589.
Amendment filed Aug. 21, 2011, in U.S. Appl. No. 11/115,589.
U.S. Appl. No. 11/115,589, Amendment and Response filed Jul. 3, 2013, 8 pages.
ITC Investigation No. 337-744, captioned: "Certain Mobile Devices, Associated Software, and Components Thereof", Jul. 18, 2013 (3 pages).
ITC Investigation No. 337-744, captioned: "Certain Mobile Devices, Associated Software, and Components Thereof", Jul. 18, 2013 (2 pages).
ITC Investigation No. 337-744, captioned: "Certain Mobile Devices, Associated Software, and Components Thereof" "Notice of Prior Art", Apr. 27, 2011, 40 pages.
ITC Investigation No. 337-744, captioned: "Certain Mobile Devices, Associated Software, and Components Thereof" Doc. No. 965692-546521_"546521", Nov. 20, 2014.
ITC Investigation No. 337-744, captioned: "Certain Mobile Devices, Associated Software, and Components Thereof" Doc. No. 974921-547238_"547238", Dec. 3, 2014.
ITC Investigation No. 337-744, captioned: "Certain Mobile Devices, Associated Software, and Components Thereof" Docket Report retrieved Jan. 9, 2015.

\* cited by examiner

METHOD AND SYSTEM FOR MANAGING CHANGES TO A CONTACT DATABASE

This application is a continuation of U.S. Pat. No. 6,909,910, filed Feb. 1, 2002, which application is incorporated herein by reference.

FIELD OF THE INVENTION

The present invention relates generally to mobile computing, and more particularly to updating a contact database within a mobile computing device.

BACKGROUND OF THE INVENTION

Manufacturers have recently observed an increased demand by businesses and consumers for multi-functional mobile communications devices. In response, manufacturers have added to mobile communication devices, such as mobile telephones, a wealth of applications and services. For example, many mobile telephones include such features as graphical displays to support web access, contact lists, and e-mail services, as well as other non-voice features.

Recently, some manufacturers have responded by combining the features of personal digital assistants (PDAs) with the features of mobile telephone devices. However, while the features of PDAs and mobile telephone devices have been physically combined into a single mobile device, many of the application programs continue to operate independently from each other. Moreover, much of the data associated with one application remains inaccessible by another application, often resulting in increased frustration and workload for the consumer.

SUMMARY OF THE INVENTION

This summary of the invention section is intended to introduce the reader to aspects of the invention and is not a complete description of the invention. Particular aspects of the invention are pointed out in other sections herein below and the invention is set forth in the appended claims, which alone demarcate its scope.

The present invention is directed towards providing a method and system for updating a contact and adding a new contact from call logs in a mobile communications device. The system includes a contact manager that is directed towards creating and updating contact cards in a contact database with information retrieved from call logs of phone calls made to or from the communications device. The method includes determining if a request is for updating an existing contact card or for adding a new contact card to the contact database. The update or addition is then made with information retrieved from call logs. According to one aspect of the present invention, information is pre-populated into a predetermined data field of the contact card, thereby reducing workload to a user.

In accordance with one aspect of the present invention, a computer-implemented method is directed towards managing changes to a contact database. The method includes receiving a request to update a contact card stored in the contact database with call information related to a phone call, retrieving a contact list of contact cards stored in the contact database, and receiving a selection of a contact card to be updated within the contact list. The method further includes updating the selected contact card with the call information related to the phone call, and replacing the existing contact card in the contact database with the updated contact card.

In another aspect of the present invention, a computer-implemented method is directed to managing changes to a contact database. The method includes receiving a request to create a new contact card in the contact database with call information related to a phone call. The method pre-populates a predetermined data field of the new contact card with call information; receives contact data to be associated with the call information; modifies a data field in the new contact card with the received contact data; and updates the contact database with the modified contact card. The predetermined data field includes at least one of a home phone number, a work phone number, and a mobile phone number.

In accordance with yet another aspect of the present invention, a computer-readable medium is encoded with computer-executable components. The components include a contact database, a call log, and a contact manager. The contact database is configured to store contact cards, wherein contact cards include data fields configured to contain contact information. The call log is configured to record incoming and outgoing phone calls, wherein each phone call corresponds to a call entry in the call log, and each call entry includes call information. The contact manager is coupled to the contact database and the call log, wherein the contact manager is arranged to update at least one data field in the contact card in the contact database with call information from a call entry in the call log in response to a user instruction.

Still another aspect of the present invention is directed towards a mobile communications device for creating a new contact card in a contact database. The device includes a contact database, a call log, and a contact manager. The contact database is configured to store contact cards, wherein contact cards include data fields for containing contact information. The call log is configured to log incoming and outgoing phone calls, wherein each phone call corresponds to a call entry in the call log, and each call entry includes call information. The contact manager is arranged to create the new contact card in the contact database with call information from a call entry in the call log in response to a user instruction.

In accordance with yet another aspect of the present invention, a device includes a graphical user interface and a user selection interface mechanism, and a method of activating a selection for changing a contact database. The method includes displaying a list of call entries in a call log of phone calls, displaying a context menu in response to a user selection of an entry in the call log, and displaying a plurality of options in the context menu, one of the options being to update a contact card in the contact database with call information from the selected entry in the call log.

Moreover, in yet another aspect of the present invention, a computer-readable medium is encoded with a plurality of data structures comprising a first data structure and a second data structure. The first data structure includes a plurality of call entries, each call entry describing call information about a phone call. The second data structure includes a plurality of contact cards, each contact card being associated with a contact. At least one contact card includes updated call information from a call entry in the first data structure.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention now will be described more fully hereinafter "with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "connected" means a direct connection between the things that are connected, without any intermediary devices or components. The term "coupled," means a direct connection between the things that are connected, or an indirect connection through one or more either passive or active intermediary devices or components. The meaning of "a," "an," and "the" include plural references. The meaning of "in" includes "in" and "on."

Briefly stated, the present invention provides a computer-implemented system and method for updating a contact database in a mobile communications device from information, such as a phone number, in a call log. The method includes determining whether the phone number is new or already exists in the contact database, and providing an opportunity for updating or adding the phone number to a contact card in the contact database.

Illustrative Operating Environment

Figure 1:
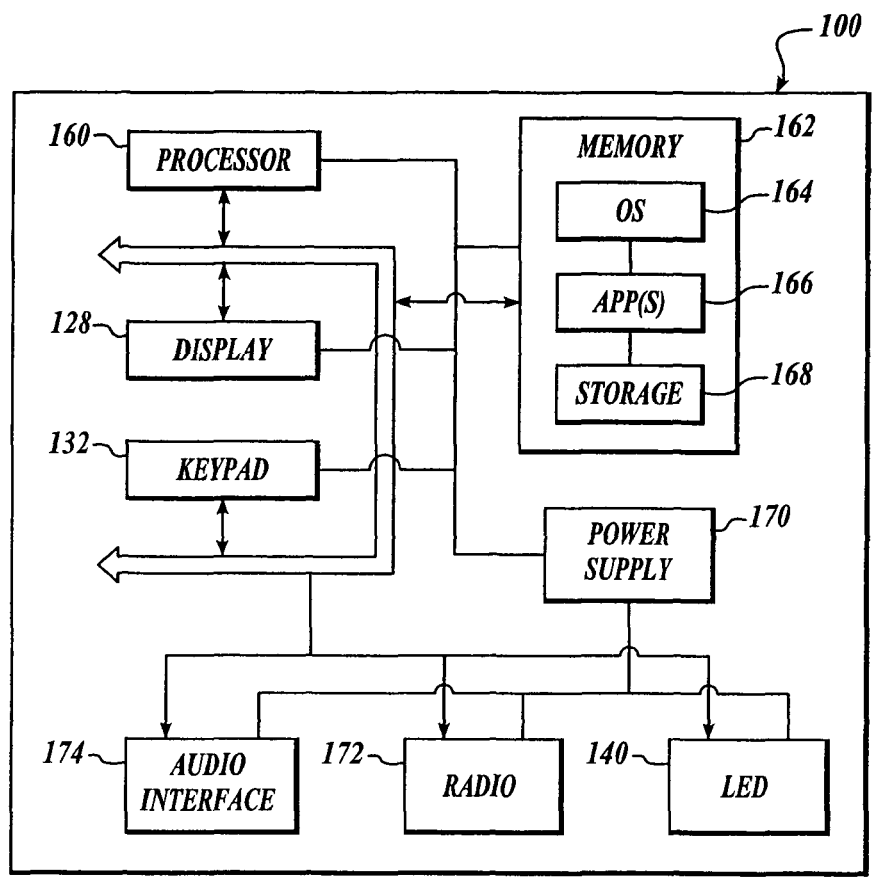
FIG. 1 is a functional block diagram illustrating an embodiment of an exemplary system for practicing the present invention.

FIG. 1 is a functional block diagram illustrating an embodiment of an exemplary communications device 100 for practicing the present invention. In one embodiment of the present invention communications device 100 is implemented as a mobile communications device, such as an integrated personal digital assistant (PDA) and wireless phone.

As shown in the figure, communications device 100 includes processor 160, memory 162, display 128, and keypad 132. Memory 162 generally includes both volatile memory (e.g., RAM) and non-volatile memory (e.g., ROM, Flash Memory, or the like). Communications device 100 includes an operating system 164, such as the Windows CE operating system from Microsoft Corporation or other such operating system, which is resident in memory 162 and executes on processor 160. Keypad 132 may be a push button numeric dialing pad (such as on a typical telephone), a multi-key keyboard (such as a conventional keyboard). Display 128 may be a liquid crystal display, or any other type of display commonly used in mobile computing devices. For example, display 128 may be touch-sensitive, and would then also act as an input device.

One or more application programs 166 are loaded into memory 162 and run on the operating system 164. Examples of application programs include phone dialer programs, contact manager, email programs, scheduling programs, word processing programs, spreadsheet programs, and so forth. Communications device 100 also includes non-volatile storage 168 within memory 162. Non-volatile storage 168 may be used to store persistent information which should not be lost if the communications device 100 is powered down. The application programs 166 may use and store information in storage 168, such as e-mail or other messages used by an e-mail application, contact information used by the contact manager, appointment information used by a scheduling program, documents used by a word processing application, and the like. A synchronization application may also reside on communications device 100 and is programmed to interact with a corresponding synchronization application resident on a host computer to keep the information stored in storage 168 synchronized with corresponding information stored at the host computer.

Communications device 100 also includes power supply 170, which may be implemented as one or more batteries. Power supply 170 might further include an external power source, such as an AC adapter or a powered docking cradle that supplements or recharges the batteries.

Communications device 100 is also shown with two types of external notification mechanisms: LED 140 and audio interface 174. These devices may be directly coupled to power supply 170 so that when activated, they remain on for a duration dictated by the notification mechanism even though processor 160 and other components might shut down to conserve battery power. LED 140 may be programmed to remain on indefinitely until the user takes action to indicate the powered-on status of the device. Audio interface 174 is used to provide audible signals to and receive audible signals from the user. For example, audio interface 174 may be coupled to a speaker for providing audible output and to a microphone for receiving audible input, such as to facilitate a telephone conversation.

Communications device 100 also includes radio 172 that performs the function of transmitting and receiving radio frequency communications. Radio 172 facilitates wireless connectivity between communications device 100 and the outside world, via a communications carrier or service provider. Transmissions to and from radio 172 are conducted under control of operating system 164. In other words, communications received by radio 172 may be disseminated to application programs 166 via operating system 164, and vice versa.

Radio 172 allows communications device 100 to communicate with other computing devices, such as over a network. Radio 172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
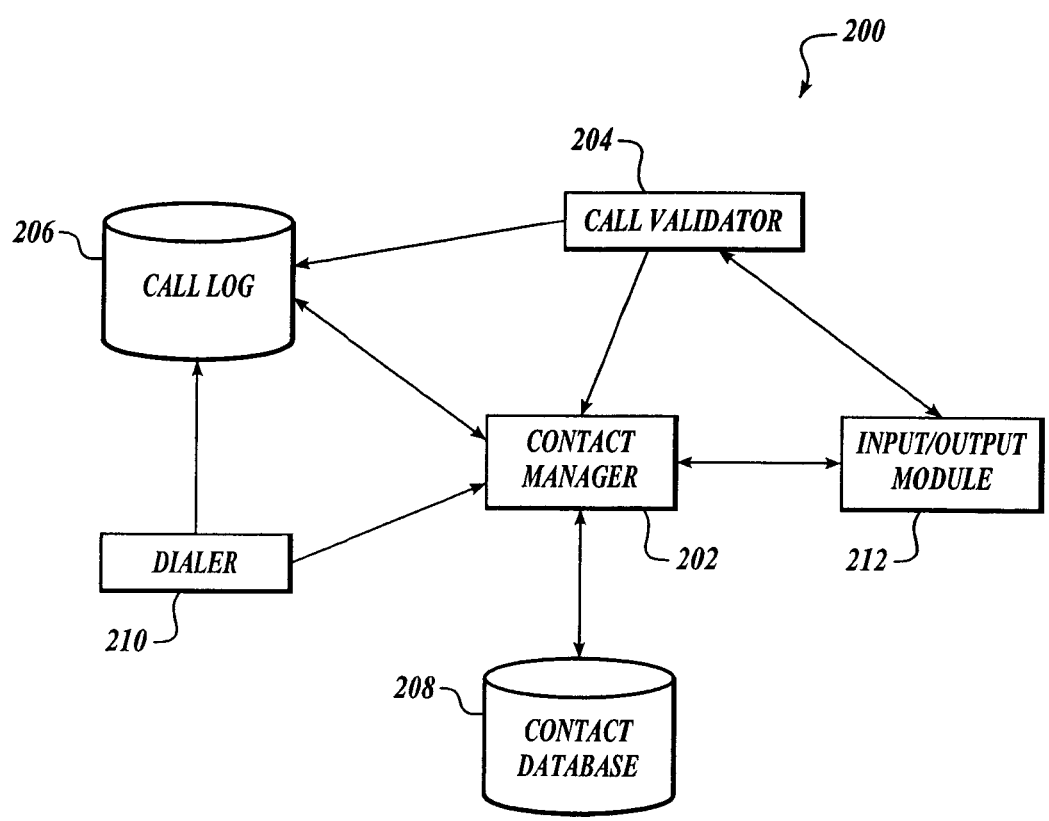
FIG. 2 is a functional block diagram of an embodiment of components in communications device 100 of FIG. 1 for managing changes to a contact database.

FIG. 2 is a functional block diagram of an embodiment showing components for managing changes to a contact database, in accordance with the present invention. Contact Management System 200 in FIG. 2 is an illustration of only one example of components and is not intended to suggest any limitation as to the scope of use or functionality of the present invention.

Contact Management System 200 may be described in the general context of computer-executable instructions, such as application programs 166, being executed in communications device 100, described in conjunction with FIG. 1. The invention may also be performed by a combination of hardware and computer-executable instructions.

As shown in the figure, Contact Management System 200 includes contact manager 202, contact database 208, call validator 204, dialer 210, call log 206, and input/output module 212. Each of these components may communicate with each other either directly or indirectly by passing messages through operating system 164.

Contact manager 202 is a software component that may be implemented within operating system 164 or as one of application programs 166 illustrated in FIG. 1. Contact manager 202 is configured to interact with other components in Contact Management System 200 to receive and manage changes to contact database 208.

Contact database 208 includes information related to a contact, such as people, businesses, and the like, with which communications device 100 may communicate. Contact database 208 may include contact information organized for each contact by separating the information of the contact into associated data fields, within a contact card. These data fields may include several phone numbers, e-mail addresses, pager number, contact name, and other call information related to the contact.

Contact database 208 is configured to receive instructions to create new contact cards and to update existing contact cards. The instructions may include the information to add to an existing contact card or with which to create a new contact card.

Call validator 204 includes software components that are configured to receive and decode call information about a caller of an incoming phone call. Call information may include a caller's phone number, the name of the caller, date and time of call, and the like. A communications carrier or service provider may provide call information to the callee of the incoming phone call when such information is available. When an incoming phone call is received (even if the phone call is not answered), call validator 204 may provide call information to call log 206 and contact manager 202. Call validator 204 may also provide call information to input/output module 212 for viewing through display 128 of FIG. 1.

Dialer 210 includes software components that are arranged to direct outgoing phone calls for communications device 100. Dialer 210 also may be in communications with and take directions from operating system 164 of FIG. 1. For example, operating system 164 may direct dialer 210 to make an outgoing phone call through radio 172 to a particular phone number provided by dialer 210.

Dialer 210 may make the outgoing phone call by requesting a wireless phone connection from a communications carrier or service provider through radio 172 (FIG. 1). When the wireless connection is established, dialer 210 may provide call information to call log 206, and contact manager 202. Call information may include phone number, date, time, call duration, and the like.

Call log 206 includes a record of calls made to and from communications device 100. In one embodiment call log 206 is implemented as a database. Each call is recorded as a call entry in call log 206. A call entry in call log 206 includes information about a particular phone call, such as phone number and whether the call was an incoming, outgoing, or missed call. Call entries may also include dates and times associated with the phone call.

Contact manager 202 may communicate with call log 206 to retrieve a call entry, or a category of call entries, such as missed calls. Contact manager 202 may incorporate additional contact information, such as a name, stored in contact database 208 that is associated with the call entry.

Furthermore, contact manager 202 may employ information in a call entry, in dialer 210, or in call validator 204 to create new contact cards or update existing contact cards within contact database 208.

Figure 4:
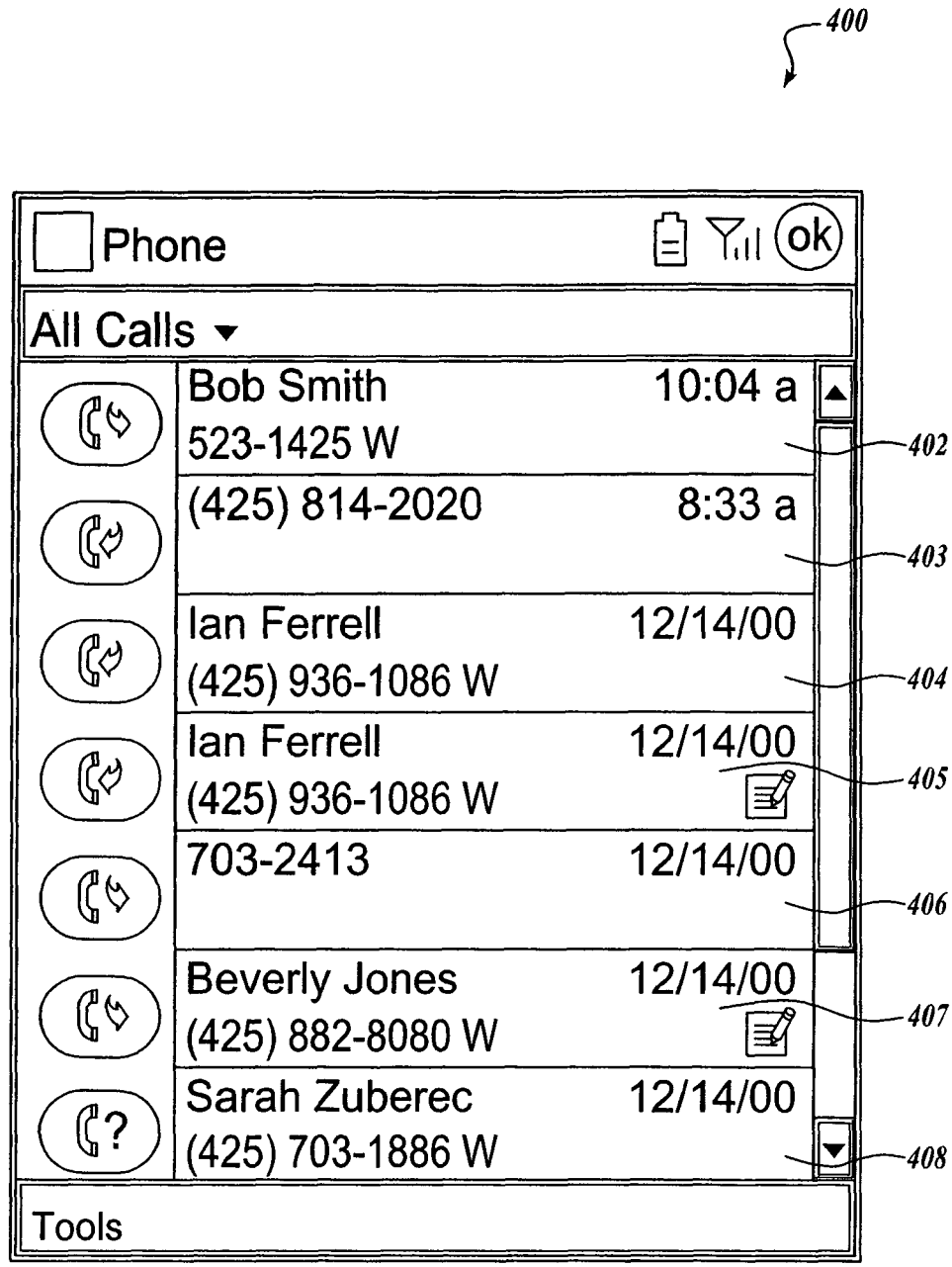
FIG. 4 is an illustrative screen shot of an embodiment of a user-interface (UI) for a call log of all calls.

Contact manager 202 also may provide the information to input/output module 212 for viewing through display 128 of FIG. 1. Briefly referring to FIG. 4 is an illustrative screen shot of an embodiment of a user-interface (UI) 400 for a call log, in accordance with the present invention. Included in UI 400 are call entry display field(s) 402-408. A typical call entry display field 402, may include name, phone number, date, time, and an indicator of whether the call entry is an incoming, outgoing, or missed call. It will be apparent that UI 400 may display only a subset of calls made to and from communications device 100 that the user has not deleted from call log 206. For example, UI 400 may display only outgoing, missed, or incoming calls, or a combination of the above. Moreover, while UI 400 illustrates only seven call entry display fields, UI 400 is not so limited, and more or less call entry display fields may be displayed, without departing from the scope or spirit of the present invention.

Input/output module 212 is a software component that is configured to provide input data to contact manager 202 that is received from hardware and other software components of communications device 100. Input/output module 212 also provides output data from contact manager 202 to other components of communications device 100. For example, keyboard 132 may inform contact manager 202 through input/output module 212 that an outgoing phone number has been entered by the user.

Generalized Operation

Figure 3:
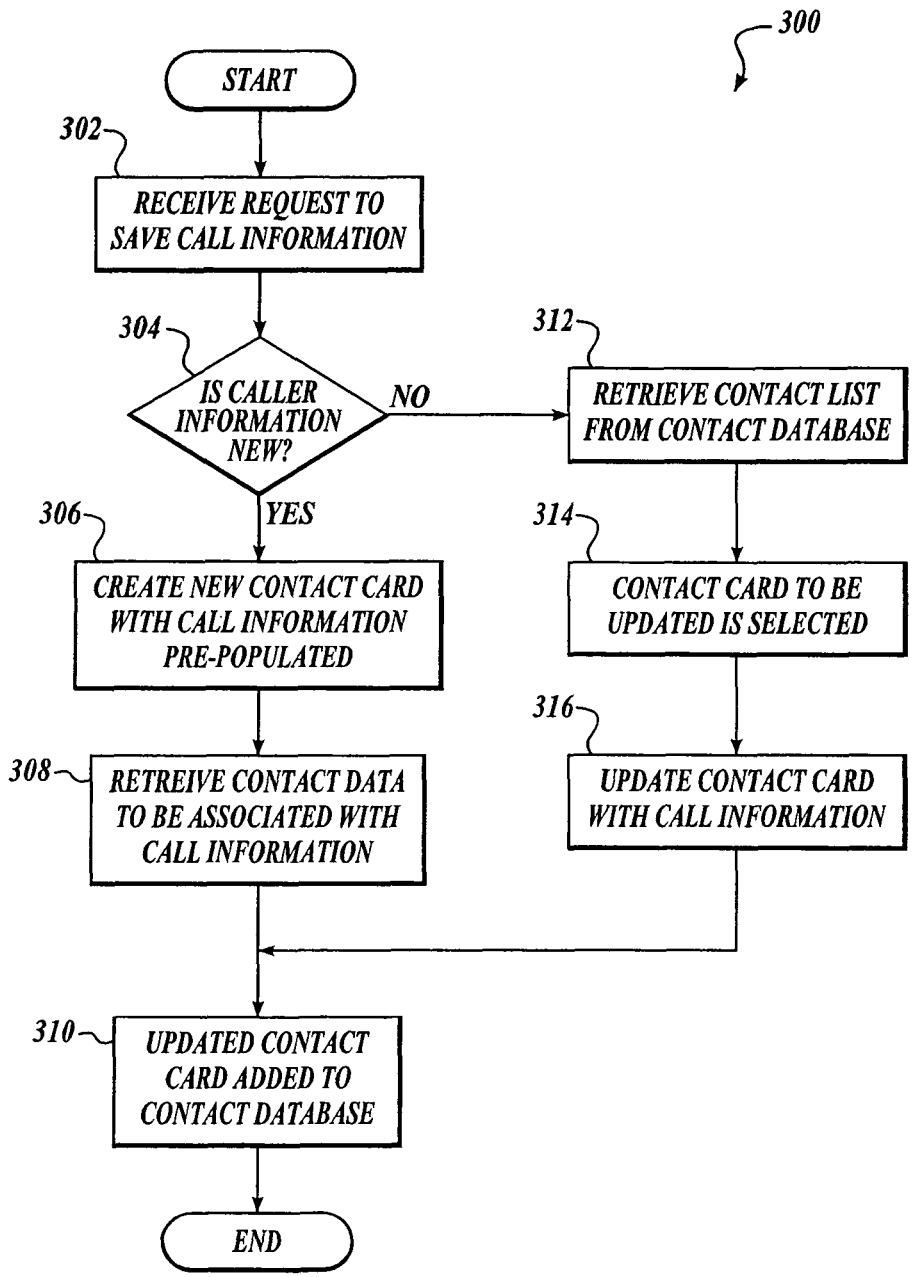
FIG. 3 is a flow diagram generally showing an embodiment of a process for updating and adding a contact to the contact database.

FIG. 3 is a flowchart generally showing an embodiment of an exemplary process 300 for updating and adding a contact to the contact database, in accordance with the present invention. Process 300 may be employed by contact manager 202 illustrated in FIG. 2.

FIGS. 5-8 are employed to provide illustrative examples to further aid in illustrating the flowchart.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Process 300 begins, after a start block, at block 302 where a request to save call information is received. In one embodiment of the present invention, call information is obtained from a call log, such as the call log shown in FIG. 4. However, call information may also be obtained from other sources, such as dialer 210 or call validator 204 shown in FIG. 1, without departing from the scope or spirit of the present invention.

Figure 5:
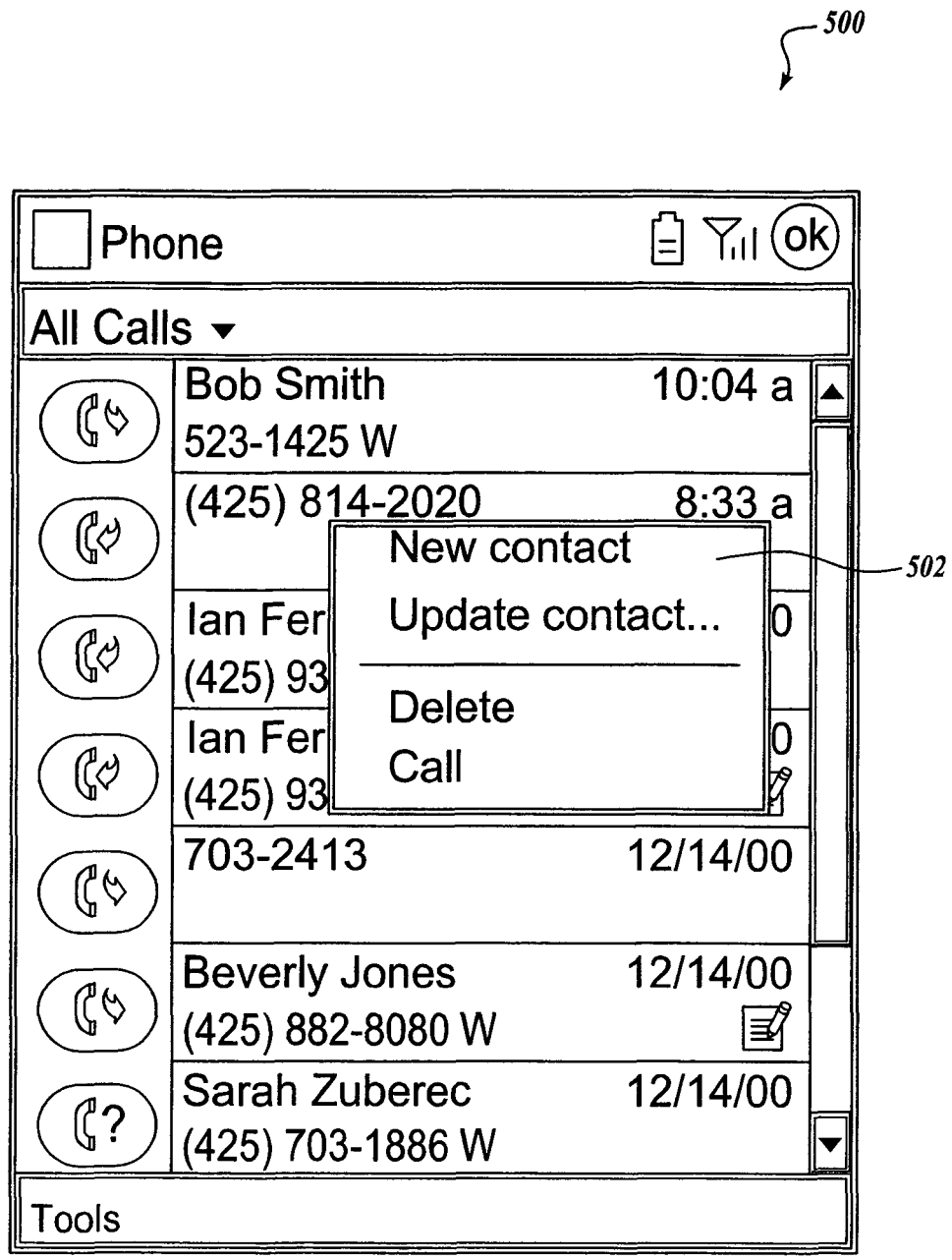
FIG. 5 is an illustrative screen shot of an embodiment of a UI for a context menu for updating or adding a contact card to the contact database.

In one embodiment of the present invention, when the user selects an entry in the call log, a context menu is displayed to the user. The context menu is configured to provide a user selectable choice to create a new contact, or to update an existing contact in the contact database. Briefly, FIG. 5 is an illustrative screen shot of an embodiment of a user-interface (UI) for a context menu 502 for updating or adding a contact to the contact database, in accordance with the present invention. When the user-interface includes a touch-sensitive display, a user may select an entry in the call log by tapping, touching, or otherwise triggering a selection within the call entry display field (such as tapping within call entry display field 402 of FIG. 4).

In another embodiment, context menu 502 includes a view contact option (not shown) that a user may select to view an existing contact card. Moreover, the view contact option also is accessible from the dialer main screen.

In yet another embodiment of the present invention, a request to save call information may be initiated through a user selection of a SAVE command, such as during a current incoming or outgoing call.

Upon receiving a request to save call information, process control flow proceeds to decision block 304.

At decision block 304, a determination is made whether the call information is for a new contact or an existing contact in the contact database. In one embodiment of the present invention, the user selects from the context menu either to create a new contact card or to update an existing contact card. In one embodiment, when the user-interface includes a touch-sensitive display, selection within context menu 502 of FIG. 5 includes tapping, touching, or otherwise triggering the desired selection. In another embodiment of the invention, when the user selects to SAVE the call information, the user is provided the choice to create a new contact, or to update an existing contact in the contact database.

If it is determined at decision block 304, that the user has selected to create a new contact in the contact database, process control flow proceeds to block 306, where a new contact card is created employing the call information.

At block 306, in one embodiment of the present invention, a new contact card is displayed to the user with the call information pre-populated into a data field. For example, the phone number within the call information may be pre-populated into a work telephone number data field, thus reducing the overall workload to the user. In another embodiment, the pre-populated data field may be at least one of a work, a home, a mobile, a pager, a car, a radio, and an assistant telephone number data field.

Figure 6:
FIG. 6 is an illustrative screen shot of an embodiment of a UI for a contact card for a new contact with a pre-populated phone number entry.

For example, FIG. 6 illustrates a screen shot of an embodiment of a UI for contact card 600 for a new contact with pre-populated phone number entry 602, in accordance with the present invention.

In still another embodiment, the user may be provided with a user selectable menu for placing the phone number into a work, a home, a mobile, or a similar telephone data field, thereby increasing the flexibility to the user.

Upon completion of block 306, process control flow moves to block 308. At block 308, additional contact information associated with the contact is received. Such contact information may include additional information the user wishes to save in the contact database, such as the contact's name and address. The user may also relocate pre-populated call information into a different data field. Process control flow continues to block 310.

Back at decision block 304, if it is determined that the user has selected to update an existing contact in the contact database, process flow control proceeds to block 312.

Figure 7:
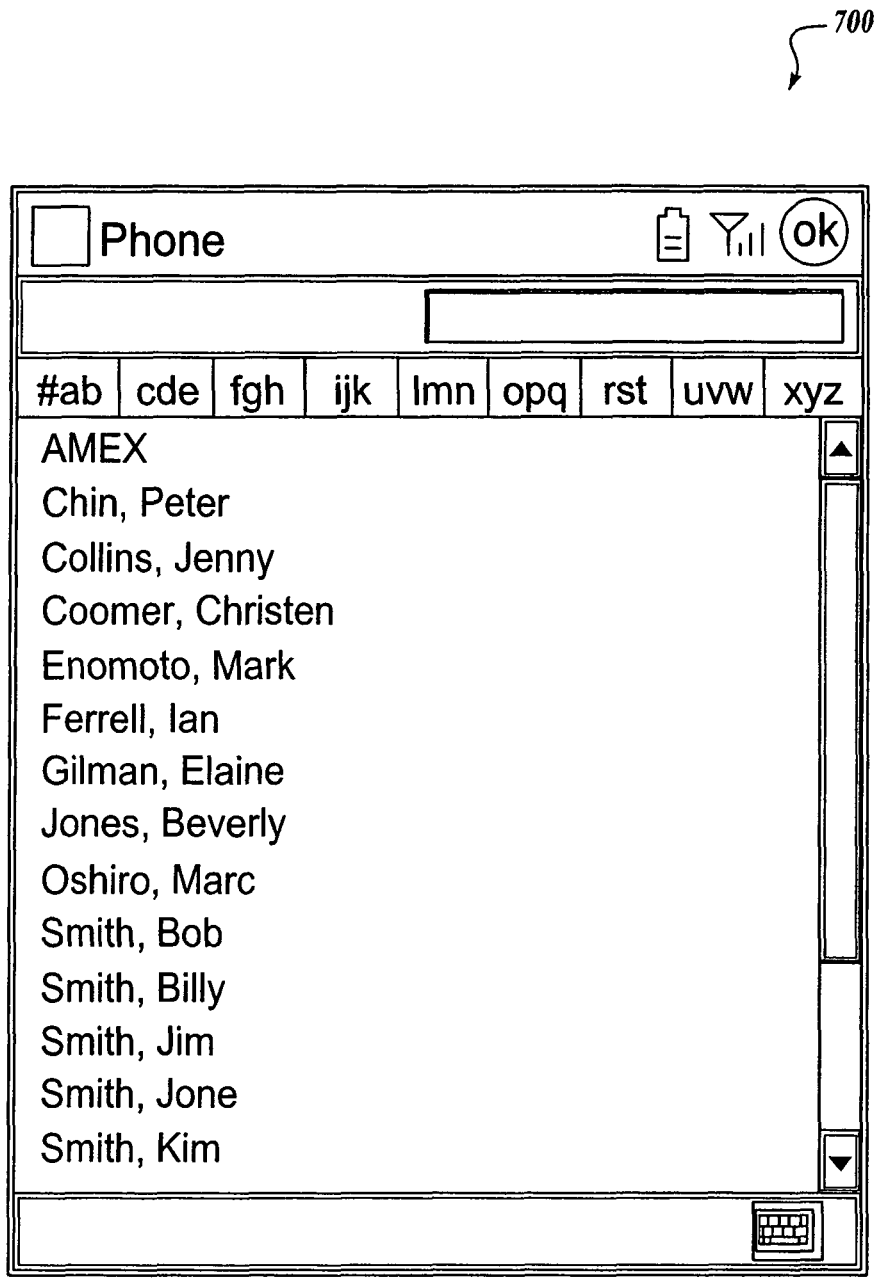
FIG. 7 is an illustrative screen shot of an embodiment of a UI for a contact list from the contact database.

At block 312, a contact list of contact names in the contact database is provided to the user. FIG. 7 is an illustrative screen shot of an embodiment of a UI for contact list 700 from the contact database, in accordance with the present invention. Typically, contact list 700 is displayed as an alphabetically sorted list by contact's last name; however, the invention is not so limited. For example, the contact list may be sorted by the most recent call (incoming or outgoing) to the least recent call, or any other order, without departing from the scope or spirit of the present invention. Process flow control continues to block 314.

Figure 8:
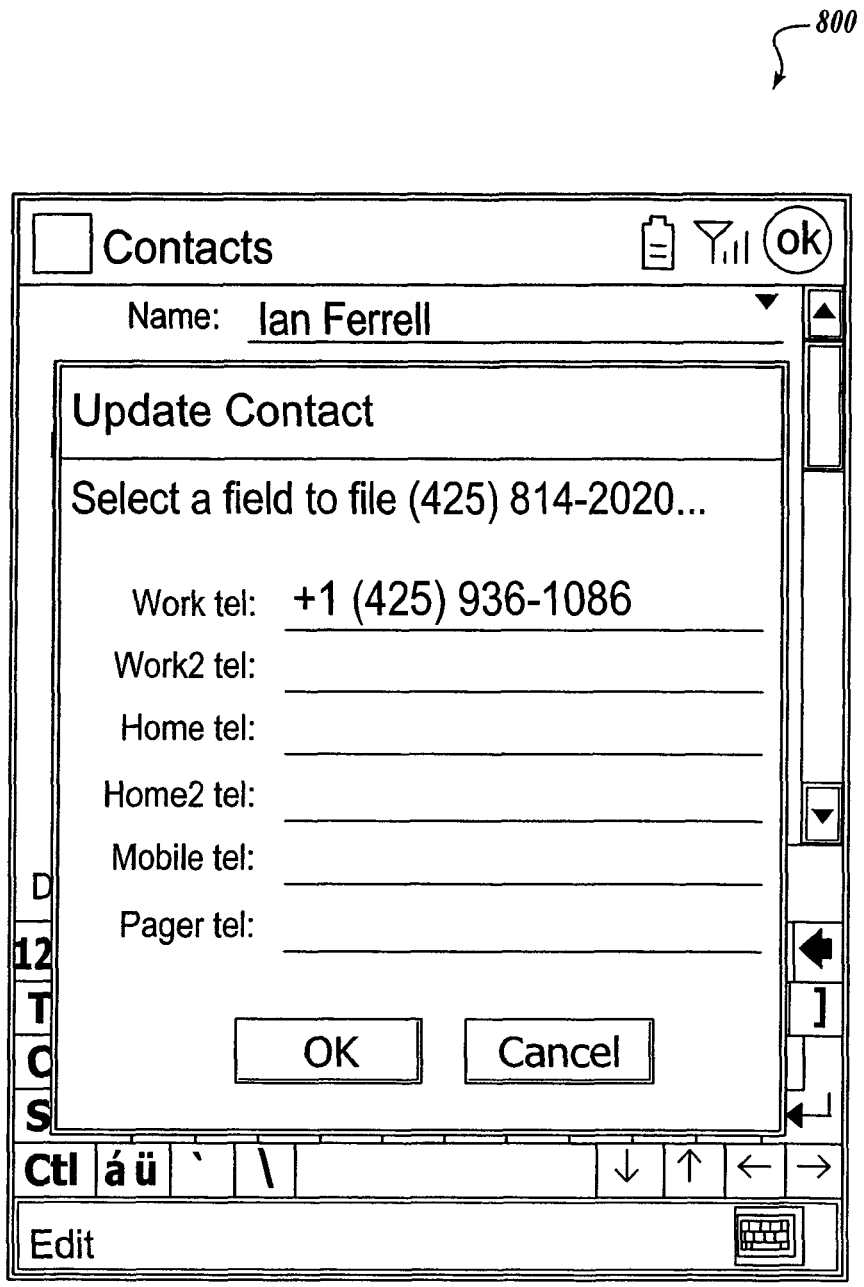
FIG. 8 is an illustrative screen shot of an embodiment of a UI for an update contact card, in accordance with the present invention.

At block 314, a selection of the contact card to be updated is received from the user. In one embodiment of the present invention, an update contact card is provided to the user. FIG. 8 is an illustrative example of an embodiment of update contact card 800, in accordance with the present invention. As shown in FIG. 8, update contact card 800 is configured to enable the user to select a data field to update with the call information.

In another embodiment of the present invention, the user is provided with a predetermined user selectable menu for placing the phone number into a work, home, or mobile telephone number data field.

Upon completion of block 314, process control flow moves to block 316. At block 316, the selected contact card is updated with the call information. For example, selection of the data field transfers the call information into that data field. Furthermore, the user may delete content of a data field, move content to a different data field, and update additional data fields for the selected contact card. For example, the user may select to insert the phone number into multiple telephone number data fields. Process control flow moves to block 310.

At block 310, the modified contact card is added to the contact database. If the contact card is an updated contact card, the previous contact card is deleted and replaced by the updated contact card. Upon completion of block 310, the logical process control flow ends.

Although the above description has illustrated updating the contact database from a call log, the present invention is not so limited. For example, the contact database may also be updated from a telephone number obtained from a dialer, or a call in progress.

CONCLUSION

The above specification, examples, and data provide a complete description of the manufacture and use of certain embodiments of the invention. Since many embodiments of the invention can be made without departing from the spirit and scope of the invention, the invention resides in the claims hereinafter appended.

We claim:

1. A method executing on a processor of a computing device for updating a contact data store, comprising:
    determining if a request to save call information that is obtained from a phone call is an update to information that is already stored in the contact data store;
    when the request to save the call information is an update to the information that is already stored in a contact card in the contact data store, then retrieving and displaying a contact list of contact cards that are stored in the contact data store;
    receiving a selection from a user of one of the displayed contact cards;
    in response to receiving the selection of the one of the displayed contact cards, modifying a data field of the selected contact card with the call information; and
    storing the modified data field of selected contact card in the contact data store.

2. The method of claim 1, wherein the contact list comprises a list of at least one contact name associated with a contact card stored in the contact data store.

3. The method of claim 1, wherein the call information comprises a phone number.

4. The method of claim 1, wherein the call information comprises a name of a caller.

5. The method of claim 1, wherein the call information comprises a date of the phone call.

6. The method of claim 1, wherein the call information comprises a time of the phone call.

7. The method of claim 1, wherein the call information comprises a duration of the phone call.

8. The method of claim 1, wherein a pre-populated data field is displayed that includes at least one of a home phone number, a work phone number, and a mobile phone number.

9. The method of claim 1, wherein a pre-populated data field that is displayed is determined by evaluating a time associated with the phone call.

10. A computer-readable storage medium storing instructions for updating a contact data store, comprising:
    determining if a request to save call information that is obtained from at least one of an incoming phone call and an outgoing phone call is an update to information that is already stored in the contact data store;
    when the request to save the call information is an update to the information that is already stored in a contact card in the contact data store, then retrieving and displaying a contact list of contact cards that are stored in the contact data store;
    receiving a user selection of one of the displayed contact cards; and
    in response to receiving the selection, storing and modifying a data field of the selected contact card with call information related to a phone call.

11. The computer-readable storage medium of claim 10, wherein the contact list comprises a list of at least one contact name associated with a contact card stored in the contact data store.

12. The computer-readable storage medium of claim 10, wherein the request to save the call information is received after the phone call.

13. The computer-readable storage medium of claim 10, wherein the call information comprises at least one of: a phone number; a name of a caller, a date of the phone call; a time of the phone call; and a duration of the phone call.

14. The computer-readable storage medium of claim 10, wherein a pre-populated data field is displayed that includes at least one of a home phone number, a work phone number, and a mobile phone number.

15. A system for updating a contact data store, comprising:
    a processor and a memory;
    a contact data store that stores contacts; and
    using the processor to perform actions, comprising:
        determining if a request to save call information that is obtained from at least one of an incoming phone call and an outgoing phone call is an update to information that is already stored in the contact data store;
        when the request to save the call information is an update to the information that is already stored in a contact card in the contact data store, then retrieving and displaying a contact list of contact cards stored in the contact data store;
        receiving a user selection of one of the displayed contact cards; and
        in response to receiving the selection, storing and modifying a data field of the selected contact card with call information related to a phone call.

16. The system of claim 15, wherein the contact list comprises a list of at least one contact name associated with a contact card stored in the contact data store.

17. The system of claim 15, wherein the request to save the call information is received after the phone call.

18. The system of claim 15, wherein the call information comprises at least one of: a phone number; a name of a caller, a date of the phone call; a time of the phone call; and a duration of the phone call.

19. The system of claim 15, wherein a pre-populated data field is displayed that includes at least one of a home phone number, a work phone number, and a mobile phone number.

20. The system of claim 15, wherein a pre-populated data field is determined by evaluating a time associated with the phone call.

* * * * *